US009695288B2

(12) United States Patent
Yang et al.

(10) Patent No.: US 9,695,288 B2
(45) Date of Patent: Jul. 4, 2017

(54) GRAFT ENGINEERING THERMOPLASTICS WITH POLYOLEFINS

(71) Applicant: ExxonMobil Chemical Patents Inc., Baytown, TX (US)

(72) Inventors: Yong Yang, Kingwood, TX (US); John R. Hagadorn, Houston, TX (US); Andy H. Tsou, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/917,401

(22) PCT Filed: Aug. 11, 2014

(86) PCT No.: PCT/US2014/050474
§ 371 (c)(1),
(2) Date: Mar. 8, 2016

(87) PCT Pub. No.: WO2015/076878
PCT Pub. Date: May 28, 2015

(65) Prior Publication Data
US 2016/0215102 A1  Jul. 28, 2016

Related U.S. Application Data

(60) Provisional application No. 61/907,463, filed on Nov. 22, 2013.

(30) Foreign Application Priority Data

Feb. 19, 2014   (EP) ..................... 14155669

(51) Int. Cl.
| C08G 63/02 | (2006.01) |
| C08G 81/02 | (2006.01) |
| C08F 255/00 | (2006.01) |
| C08F 283/00 | (2006.01) |
| C08F 290/04 | (2006.01) |
| C08G 69/48 | (2006.01) |
| C08G 61/02 | (2006.01) |
| C08G 61/12 | (2006.01) |
| C08L 71/12 | (2006.01) |
| C08G 64/00 | (2006.01) |
| C08G 73/10 | (2006.01) |

(52) U.S. Cl.
CPC .......... C08G 81/025 (2013.01); C08F 255/00 (2013.01); C08F 283/00 (2013.01); C08F 290/04 (2013.01); C08G 61/02 (2013.01); C08G 61/12 (2013.01); C08G 69/48 (2013.01); C08L 71/123 (2013.01); *C08G 73/105* (2013.01); *C08G 73/1071* (2013.01); *C08G 2261/128* (2013.01); *C08G 2261/45* (2013.01); *C08G 2261/75* (2013.01); *C08G 2261/77* (2013.01)

(58) Field of Classification Search
CPC .................................................. C08G 81/025
USPC ......................................... 525/240, 242, 391
See application file for complete search history.

(56) References Cited

U.S. PATENT DOCUMENTS

| 4,341,879 | A | 7/1982 | Sugio et al. |
| 5,132,478 | A | 7/1992 | Ho et al. |
| 5,229,456 | A | 7/1993 | Ilenda et al. |
| 5,244,971 | A | 9/1993 | Jean-Marc |
| 5,328,956 | A | 7/1994 | Hasebe et al. |
| 6,117,962 | A | 9/2000 | Weng et al. |
| 8,461,261 | B2 | 6/2013 | Nomura et al. |
| 2002/0165317 | A1 | 11/2002 | Adedeji et al. |
| 2004/0214952 | A1 | 10/2004 | Kannan et al. |
| 2008/0234436 | A1* | 9/2008 | Sakamoto ............. C08F 290/02 525/313 |
| 2009/0270296 | A1 | 10/2009 | Patil et al. |
| 2011/0021703 | A1 | 1/2011 | Nomura et al. |

FOREIGN PATENT DOCUMENTS

| EP | 0 025 200 | 3/1981 |
| EP | 0 083 098 | 7/1983 |
| EP | 0 138 599 | 4/1985 |
| JP | S50 126800 | 4/1984 |
| WO | 87/03603 | 6/1987 |
| WO | 2007/136460 | 11/2007 |
| WO | 2009/155471 | 12/2009 |
| WO | 2009/155472 | 12/2009 |
| WO | 2009/155510 | 12/2009 |
| WO | 2009/155517 | 12/2009 |

OTHER PUBLICATIONS

Diez-Pascual, A. M. et al., "Tuning the properties of carbon fiber-reinforced poly(phenylene sulphide) laminates via incorporation of inorganic nanoparticles," Polymer, vol. 53, 2012, pp. 2369-2378.

(Continued)

Primary Examiner — Terressa Boykin

(57) ABSTRACT

A graft copolymer comprising polyolefin and engineering thermoplastic components, wherein the thermoplastic component is a polymer comprising heteroatoms or heteroatom containing moieties in its backbone and phenyl or substituted phenyl groups, the polyolefin component covalently bound to the engineering thermoplastic component. The graft copolymer is the reaction product of an engineering thermoplastic having at least one phenylene in the polymer backbone, and a vinyl/vinylidene terminated polyolefin having a weight average molecular weight of at least 300 g/mole, wherein the vinyl/vinylidene terminated polyolefin is selected from polyethylenes, polypropylenes, ethylene-propylene copolymers, polyisobutylenes, polydienes, propylene-based elastomers, ethylene-based plastomers, and combinations thereof.

25 Claims, 11 Drawing Sheets

(56) References Cited

OTHER PUBLICATIONS

Flat, J.J., "*New comb-like nanostructured copolymers: A promising route towards new industrial applications*," Polymer Degradation and Stability, vol. 92, 2007, pp. 2278-2286.
Ikkala, O.T. et al., "*Effects of Compatibilization on Fractionated Crystallization of PA6/PP Blends*," Journal of Applied Polymer Science, vol. 49, 1993, pp. 1165-1174.
Lai, S-M. et al., "*Preparation and Properties of Melt-Mixed Metallocene Polyethylene/Silica Nanocomposites*," Polymer Engineering and Science, 2011, pp. 434-444.
Sun, Y-J. et al., "*In situ compatibilization of polyolefin and polystyrene using Friedel-Crafts alkylation through reactive extrusion*," Polymer, vol. 39, 1998, pp. 2201-2208.

* cited by examiner

GRAFT ENGINEERING THERMOPLASTICS WITH POLYOLEFINS

PRIORITY CROSS-REFERENCE TO RELATED APPLICATIONS

This application is a National Stage Application of International Application No. PCT/US2014/050474, filed Aug. 11, 2014, which claims priority to U.S. Application No. 61/907,463, filed Nov. 22, 2013, the disclosures of which are hereby incorporated by reference in their entireties.

FIELD OF THE INVENTION

The present invention is related to a copolymer formed by combining two larger reactive polymers having distinct properties to form a graft copolymer, and more particularly to a graft copolymer having a polyolefin component (low Modulus) and an engineering thermoplastic component (high Modulus).

BACKGROUND

Most polyolefins (POs) have limited operation temperature ranges due to their inherent low heat distortion temperatures (HDTs). This is driven by a low melting temperature ($T_m$), which results from a relatively low crystalline cohesive energy, especially when compared to engineering thermoplastics (ETPs). Another consequence of the relative "softness" of the PO crystals, compared to ETPs, is lower moduli. Thus, POs are not typically used as structural materials.

ETPs can be defined as a class of polymers that possess one or more high-performance engineering properties (mechanical, thermal, electrical, chemical-resistant, flame-retardant, etc.). Polyamide, an example of an ETP, boasts good thermal properties (e.g., HDT of Nylon™ 6, 6 is 194° C. and its $T_m$ is 270° C.), good stiffness and tensile strength, and good abrasion resistance. Laminar polyamides additionally have outstanding barrier properties to oxygen/air. Some representative ETPs that typically have even superior heat resistance are poly(phenylene ether) (PPE, $T_g$ of about 260° C.), which also has excellent dimensional and hydrolytic stability; poly(phenylene sulfide) (PPS, $T_m$ of about 285° C.); polysulfone; polyimide; and poly(ether ether ketone) (PEEK). All these ETPs require very high processing temperatures (typically greater than 250° C. and in some cases greater than 300° C.). Most of them, with few exceptions, most notably PEEK and polycarbonate (PC), also suffer from poor impact strength. The processing difficulties along with their relative low toughness, especially at low temperatures, are the two main constraints that limit broader use of ETPs.

One approach to improve the processability and/or toughness of an ETP is to blend it with a "soft" polymer or glass/carbon fibers for reinforcement. For example, PPE can be blended with polystyrene (PS) at any ratio without compatibilizer, or with polypropylene or polyamide with compatibilizer, to bring down the processing temperature. However, some engineering properties are compromised, and the compatibilizer introduces additional costs. A less common approach is to covalently modify ETPs with a soft polymer such as maleated-polypropylene, either through radical reactions or thermal reactions at very high temperatures. These non-controllable reactions, in most cases under harsh conditions, give rise to poorly defined structures and morphology, gels and compromised properties.

The synthesis of graft copolymers disclosed in this invention utilizes mild catalytic Friedel-Crafts-type alkylation reactions. A wide variety of ETPs contain aromatic moieties that are capable of undergoing alkylation. Unsaturated POs, more specifically vinyl/vinylidene-terminated polyolefins (VTPOs), can be easily grafted onto the ETP backbone. This invention provides a platform for a new generation of high-performance low-cost PO-based engineering polymeric materials, combining the advantages of individual ETP and PO, overcoming their individual disadvantages, and generating additional benefits such as well-defined morphology and high stability.

Relevant art includes *Polymer Engineering and Science* 434 (2011); 53 *Polymer* 2369 (2012); 92 *Polymer Degradation and Stability* 2278 (2007); 39 *Polymer* 2201 (1998); "Effects of Compatibilization on Fractionated Crystallization of PA6/PP Blends," T. Ikkala, R. M. Holsti-Miettinen, and J. Seppala, 49 *Journal of Applied Polymer Science* 1165 (1993); US 2009-0270296 A1; U.S. Pat. No. 5,132,478; U.S. Pat. No. 5,328,956; U.S. Pat. No. 6,117,962; U.S. Pat. No. 8,461,261; EP 0 138 599; WO2009-155472; WO2009-155471; WO2007-136460; WO2009-155510; and WO87-03603.

SUMMARY

Disclosed herein is a graft copolymer comprising (or consisting essentially of, or consisting of) polyolefin and engineering thermoplastic components, wherein the thermoplastic component is a polymer comprising heteroatoms or heteroatom containing moieties in its backbone and phenyl or substituted phenyl groups, the polyolefin component covalently bound to the engineering thermoplastic component.

Also disclosed is a graft copolymer comprising (or consisting essentially of, or consisting of) polyolefin and engineering thermoplastic components, the graft copolymer having the structure:

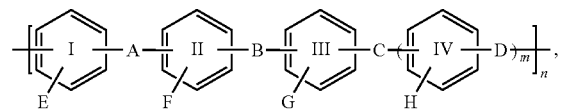

wherein each I, II, III, and IV are, independently, 1,2-phenyl, 1,3-phenyl or 1,4-phenyl, any of which may be substituted with one or more electron-donating substituents;

at least one of A, B, C, and D are, independently, an oxygen, nitrogen, sulfur, or phosphorous atom, or a moiety comprising oxygen, nitrogen, sulfur, phosphorous, or a combination thereof;

at least one of E, F, G, and H are one, two or three polyolefins bound to I, II, III, and IV, respectively, and having a weight average molecular weight of at least 300 g/mole; and m is an integer within the range from 1 to 10, and n is an integer within the range from 10 to 500.

DETAILED DESCRIPTION

Figure 1:
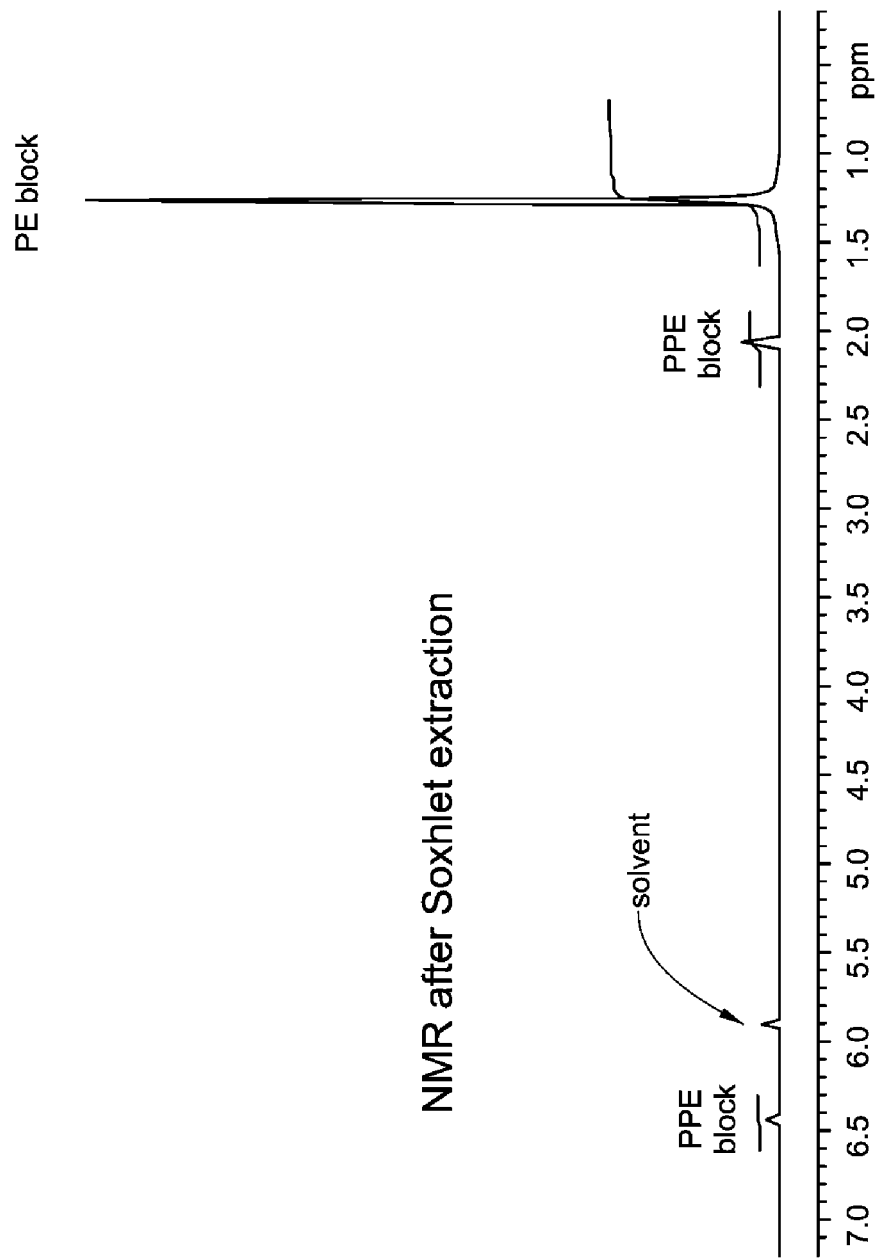
FIG. 1. $^1$H NMR spectrum of PPE-PE copolymer in TCE-$d_2$ at 120° C.

The synthesis of graft copolymers disclosed in this invention utilizes mild catalytic Friedel-Crafts-type alkylation reactions. A wide variety of ETPs contain aromatic moieties that are capable of undergoing alkylation. It has been found that unsaturated POs, more specifically vinyl/vinylidene-terminated polyolefins ("VT-POs"), can be easily grafted onto the ETP backbone. This invention provides a platform for a new generation of high-performance low-cost PO-based engineering polymeric materials, combining the advantages of individual ETP and PO, overcoming their individual disadvantages, and generating additional benefits such as well-defined morphology and high stability.

Friedel-Crafts reactions involve reactive intermediates such as acyl cations, carbocations, carboxonium ions, iminium ions, and other species. These reactions are of great practical value, being used to produce chemical feedstock, synthetic intermediates, and fine chemicals, for many years. The vinyl/vinylidene end group of VT-PO is a good precursor for carbocation, which acts as an electrophile, under a Brønsted or Lewis acid catalyst. On the other hand, many ETPs have arene groups that can be nucleophiles in the Friedel-Crafts reactions. The synthesis of graft copolymers uniquely utilizes this industry-friendly, efficient, convenient and low-cost reaction, circumventing additional functional group transformations of the vinyl group, which were commonly required in the previous couplings of PO and ETP.

Therefore, the present invention is directed to graft copolymers of polyolefins (POs) grafted onto ETP backbones, and compositions thereof, having excellent thermal, mechanical, and dimensional stability properties of ETP while possessing exceptional processability and toughness of POs. Specifically, these graft copolymers are preferred to have one or more PO branches. The ETP precursors are preferred to have one or more aromatic moieties in the polymer repeating unit, or monomer, that are capable of undergoing Friedel-Crafts-type alkylation reactions. The ETPs can be, but are not limited to aromatic polyamides, aromatic polyimides, aromatic poly(amide imide)s, aromatic polycarbonates, aromatic polyesters, poly(ether ether ketone)s, poly(ether ketone ketone)s, aromatic polysulfones, poly(phenylene ether)s, poly(phenylene sulfide)s, and polyxylylenes, but most preferably poly(phenylene ether)s "PPE"). The ETPs can be manufactured from one or more monomers or monomer precursors.

The PO precursors are preferred to have one or more unsaturations, more preferably at the chain ends. The chain end unsaturation can be vinyl or vinylidene, or blends thereof. The crystalline or amorphous POs, include but are not limited to polyethylene, polypropylene (isotactic, syndiotactic, or atactic), ethylene-propylene, ethylene-butene, ethylene-hexene, ethylene-octene copolymers, propylene-butene, propylene-hexene, propylene-octene copolymers, α-olefin homopolymers and copolymers, cyclic olefin homopolymers and copolymers, polydiene, polyisobutylene, and combinations thereof. A graft copolymer of the preferred composition can be synthesized by Friedel-Crafts-type alkylation of selective aromatic moieties of the ETP precursor with PO precursors with unsaturations, in a solution or solid state (such as in extruder) reaction. Compositionally, it is preferred to have the PO wt % in the resulting graft copolymers be greater than 50 wt %, more preferably greater than 55 wt %, and most preferably greater than 60 wt %.

The Engineering Thermoplastic

The ETP exemplified herein is PPE. It is expected that the disclosed methods can be extended to ETPs beyond PPE that share the following generalized chemical structure (I):

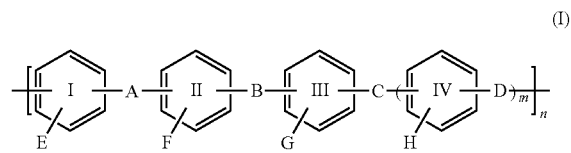

Specific examples of the ETPs include, but are not limited to:

Nylon MXD6 (Reny®, Mitsubishi Gas Chemical), when I=II=III=IV=1,3-phenyl, m=1, A=B=C=D=—CH$_2$—NH—CO—(CH$_2$)$_4$—CH$_2$—.

PC (Lexan®, SABIC Innovative Plastics, Makrolona®, Bayer, Calibre®, Dow, Panlitem®, Teijin, Iupilona®, Mitsubishi, Xantar®, DSM), when I=II=III=IV=1,4-phenyl, m=1, A=C=—C(CH$_3$)$_2$—, B=D=—OCOO—.

PEEK (Victrex®, Victrex Plc, APC®, Cytec), when I=II=III=1,4-phenyl, m=0, A=B=—O—, C=—CO—.

Polyimide, e.g., Poly(pyromellitimide-1,4-diphenyl ether) (Kapton®, Vespel®, Pyralux®, Pyralin®, Interra®, DuPont), when I=II=III=IV=1,4-phenyl, m=1, A=C=—O—, B=D=pyromellitic diimido.

Bisphenol-A Polysulfone (Udel®, Solvay), when I=II=III=IV=1,4-phenyl, m=1, A=—C(CH$_3$)$_2$—, B=D=—O—, C=—SO$_2$—.

PPE, e.g., Poly(2,6-dimethyl-1,4-phenylene oxide) (PPO®, Noryl®, Noryl GTX®, Prevex®, Sabic Innovative Plastics, Xyron®, Ashahi Chemical, Iupiace®, Lemalloy®, Mitsubishi Engineering Plastics, Artley®, Sumitomo Chemical Co., Ltd., Blue Star®, Blue Star), when I=II=III=IV=2,6-dimethyl-1,4-phenyl, m=1, A=B=C=D=—O—.

PPS (Ryton®, Chevron Phillips Chemical, Fortron®, Celanese, Torelina®, Toray), when I=II=III=IV=1,4-phenyl, m=1, A=B=C=D=—S—.

Poly(p-xylylene) (Parylene®, formerly Union Carbide), when I=II=III=IV=1,4-phenyl, m=1, A=B=C=D=—CH$_2$CH$_2$—.

In structure (I) above, and throughout the description, E, F, G and H represent hydrogen atoms or C$_1$ to C$_{10}$ alkyls, or $C_6$ to $C_{12}$ aryls, and heteroatom substituted version thereof (e.g., amines, mercaptans, sulfonates, hydroxyl, carboxy, etc.), when the structure represents and ETP. In (I), E, F, G, and H represent polyolefins as described further herein, when the structure (I) represents the inventive graft copolymer.

The invention includes a graft copolymer comprising polyolefin and engineering thermoplastic components, wherein the thermoplastic component is a polymer comprising heteroatoms or heteroatom containing moieties in its backbone and phenyl or substituted phenyl groups, the polyolefin component covalently bound to the engineering thermoplastic component. The inventive graft copolymer may be described by the structure (I) more generally, wherein:

each of I, II, III and IV are, independently, 1,2-phenyl, 1,3-phenyl or 1,4-phenyl, any of which may be substituted with one or more electron-donating substituents;

at least one of A, B, C, and D are, independently, an oxygen, nitrogen, sulfur, or phosphorous atom, or a moiety comprising oxygen, nitrogen, sulfur, phosphorous, or a combination thereof;

at least one of E, F, G, and H are one, two or three polyolefins bound to I, II, III, and IV, respectively, and having a weight average molecular weight of at least 300 g/mole; and m is an integer within the range from 1 to 10, and n is an integer within the range from 10 to 500.

More preferably, the electron-donating substituents are selected from the group consisting of $C_1$ to $C_{10}$ alkyls, $C_1$ to $C_{10}$ alkoxys, $C_1$ to $C_{10}$ mercaptans, chlorine, bromine, iodine, hydroxyl, and combinations thereof. Also, more preferably, the A, B, C, and D substituents are selected from the group consisting of $C_1$ to $C_{10}$ carboxy-containing moieties, $C_1$ to $C_{10}$ imido-containing moieties, $C_1$ to $C_{10}$ sulfido-containing moieties, sulfur, sulfide, carboxy, carboxylate, imido, nitrogen, and combinations thereof. Even more preferably, the A, B, C, and D substituents are selected from the group consisting of —CH$_2$—NH—CO—(CH$_2$)$_4$—CH$_2$—, —OCOO—, CO—, pyromellitic diimidos, —SO$_2$—, sulfur, oxygen, nitrogen, phosphorous, and combinations thereof. The engineering thermoplastic useful herein (either as a reactant in the graft reaction or as the component of the copolymer) preferably, has a weight average molecular weight (Mw) within a range from 5,000 or 10,000 or 15,000 g/mole to 20,000 or 30,000 or 50,000 or 80,000 g/mole. Most preferably in structure (I) above, A, B, C, and D is oxygen, and I, II, III, and IV are 2,6-dimethyl-1,4-phenyl, and m is 1.

Preferably, the ratio of the polyolefin component to the engineering thermoplastic component in the graft copolymer is within a range of from 99:1 or 90:10 or 80:20 or 55:45 to 45:55 or 20:80 or 10:90 or 1:99. For highly processable compositions, the desirable range is from 99:1 to 70:30. For compositions with high HDT, the desirable range is from 70:30 to 1:99.

Stated another way, the invention is directed to the reaction product of an engineering thermoplastic having at least one phenylene in the polymer backbone, and a vinyl/vinylidene terminated polyolefin having a weight average molecular weight of at least 300 g/mole, the reaction product being the inventive graft copolymer. Preferably, the vinyl/vinylidene terminated polyolefin is selected from vinyl/vinylidene-terminated versions of polyethylenes, polypropylenes, ethylene-propylene copolymers, polyisobutylenes, polydienes, propylene-based elastomers, ethylene-based plastomers, and combinations thereof.

The reaction between the ETP and PO is facilitated with a Friedel-Crafts type of catalyst at a temperature within the range from 80 or 100° C. to 140 or 160 or 180 or 200° C. The polymers may be reacted in neat form (without a diluent) or with some amount of diluent added such as hexanes, toluene, xylenes, or other suitable diluent.

The Vinyl/Vinylidene Terminated Polyolefin

The vinyl/vinylidene terminated polyolefins useful in the inventive graft copolymer can be made in any number of ways, and is most desirably a vinyl terminated polyolefin ("VTPO"), but may include some vinylidene terminal groups. Preferably, the VTPO's useful herein are polymers as first described in US 2009/0318644 (referred to therein as vinyl terminated "macromers" or "macromonomers") having at least one terminus (CH$_2$CH—CH$_2$-oligomer or polymer) represented by formula (II):

allylic vinyl end group where the "~~~" represents the oligomer or polymer chain. Preferably, the allyl chain ends are represented by the formula (III):

The amount of allyl chain ends is determined using $^1$H NMR at 120° C. using deuterated 1,1,2,2-tetrachloroethane as the solvent on a 500 MHz machine, and in selected cases confirmed by $^{13}$C NMR. These groups (II) and (III) will react to form a chemical bond with a metal, as mentioned above, to form the M-CH$_2$CH$_2$-polymer. In any case, Resconi has reported proton and carbon assignments (neat perdeuterated 1,1,2,2-tetrachloroethane used for proton spectra, while a 50:50 mixture of normal and perdeuterated 1,1,2,2-tetrachloroethane was used for carbon spectra; all spectra were recorded at 100° C. on a Bruker AM 300 spectrometer operating at 300 MHz for proton and 75.43 MHz for carbon) for vinyl-terminated propylene polymers in Resconi et al, 114 J. AM. CHEM. SOC. pp. 1025-1032 (1992) that are useful herein.

The vinyl-terminated propylene-based polymers may also contain an isobutyl chain end. "Isobutyl chain end" is defined to be an oligomer having at least one terminus represented by the formula (IV):

Preferably, the isobutyl chain end is represented by one of the following formulae (V):

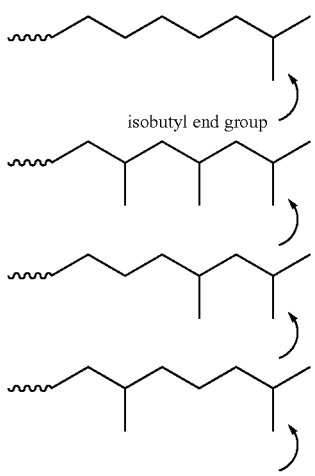
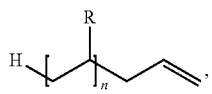

(V)

(VI)

The percentage of isobutyl end groups is determined using $^{13}$C NMR (as described in the example section) and the chemical shift assignments in Resconi for 100% propylene oligomers. Preferably, the vinyl-terminated polymers described herein have an allylic terminus, and at the opposite end of the polymer an isobutyl terminus.

The VTPOs can be made by any suitable means, but most preferably, the VTPOs are made using conventional slurry or solution polymerization processes using a combination of bridged metallocene catalyst compounds (especially bridged bis-indenyl or bridged 4-substituted bis-indenyl metallocenes) with a high-molecular volume (at least a total volume of 1000 Å$^3$) perfluorinated boron activator, for example as described in US 2012-0245299.

The vinyl terminated polyolefin can be any polyolefin having a vinyl-terminal group, as described above, any of which may have a number average molecular weight ($M_n$) of at least 300 g/mole. Preferably, greater than 90 or 94 or 96% of the polyolefin comprises terminal vinyl groups; or within the range of from 50 or 60 wt % to 70 or 80 or 90 or 95 or 98 or 99%. As described above, the vinyl terminated polyolefins preferably have a Mn value of at least 200 or 400 or 1000 or 5000 or 20,000 g/mole, or within the range of from 200 or 400 or 500 g/mole to 20,000 or 30,000 or 40,000 or 50,000 or 100,000 or 200,000 or 300,000 g/mole. The vinyl terminated polyolefins preferably have a weight average molecular weight ($M_w$) value of at least 500 or 800 or 1000 or 5000 or 20,000 g/mole, or within the range of from 500 or 800 or 1000 or 2000 g/mole to 6,000 or 10,000 or 12,000 or 20,000 or 30,000 or 40,000 or 50,000 or 100,000 or 200,000 or 300,000 g/mole. Preferably, the VTPO useful herein is amorphous polypropylene, and desirably has a glass transition temperature ($T_g$) of less than 10 or 5 or 0° C., more preferably, less than −10° C.; or within the range of from 0 or −5 or −10° C. to −30 or −40 or −50° C. or as described herein. The VTPOs are preferably linear, meaning that there is no polymeric or oligomeric branching from the polymer backbone, or described quantitatively, having a branching index "g" (or g'$_{(vis\ avg)}$) least at let 0.90 or 0.96 or 0.97 or 0.98, wherein the "branching index" is well known in the art and measurable by published means, and the value of such branching index referred to herein is within 10 or 20% of the value as measured by any common method of measuring the branching index for polyolefins as is known in the art such as in US 2013-0090433.

A particularly preferred VTPO is one wherein the vinyl terminated polyolefin is a compound or mixture of compounds represented by the formula (VI):

wherein each R is selected from hydrogen and $C_1$ to $C_4$ or $C_{10}$ alkyls; and n is an integer from 2 or 4 or 10 or 20 to 50 or 100 or 200 or 500 or 800.

The Graft Copolymer and its Compositions

The graft copolymer including any ETP of structure (I) above has many desirable properties. Preferably, for example, the Young's Modulus of the graft copolymer is at least 2 times or 3 times the value of the vinyl/vinylidene terminated polyolefin. Also, the Notched Izod Impact strength of the graft copolymer is preferably at least 2 times or 3 times or 4 times the value for the engineering thermoplastic. Also, the graft copolymer preferably has a branching index, g$_{vis\cdot avg}$, of less than 0.80 or 0.70 or 0.60.

Most preferably, the engineering thermoplastic is a PPE wherein in structure (I) each of A, B, C, and D is oxygen, and I, II, III and IV are 2,6-dimethyl-1,4-phenyl, and m is 1 ("PPE-VTPO"). The "PE" is a polyethylene homopolymer or $C_3$ to $C_{10}$ α-olefin copolymer or ethylene, where the copolymer comprises within the range from 0.5 to 10 or 15 wt % α-olefin derived units. For the graft copolymer in general, and the PPE-VTPO copolymer in particular, the branching index, g$_{vis\cdot avg}$, is less than 0.80 or 0.70 or 0.60. The number average molecular weight ($M_n$) of the graft copolymer is preferably within a range of from 40,000 or 50,000 or 60,000 g/mole to 100,000 or 140,000 or 180,000 or 200,000 g/mole; and preferably the weight average molecular weight ($M_w$) is within a range from 100,000 or 150,000 g/mole to 200,000 or 250,000 or 300,000 or 350,000 g/mole. Also, the z-average molecular weight ($M_z$) of the graft copolymer, in general and for the PPE-VTPO copolymer, is within a range from 50,000 or 80,000 or 100,000 or 200,000 or 250,000 or 300,000 or 350,000 g/mole to 400,000 or 450,000 or 500,000 or 550,000 or 600,000 g/mole; most desirably, within a range of from 250,000 or 300,000 or 350,000 g/mole to 400,000 or 450,000 or 500,000 or 550,000 or 600,000 g/mole. These ranges apply to both LS or DRI GPC analysis of the copolymer. Further, the Young's Modulus of the PPE-VTPO graft copolymer in this instance is within a range of from 250 or 260 MPa to 280 or 300 or 320 MPa.

The graft copolymers find use in a number of structural components such as automotive parts. As such, it may be desirable to blend the inventive graft copolymer with either a polyolefin, an engineering thermoplastic, or a combination of the two. Suitable polyolefins would include polypropylenes, polyethylenes, polyisobutylenes, polydienes, propylene-based elastomers, ethylene-based plastomers, and blends thereof. Suitable ETPs would include any of those named above, either different or the same as the ETP used in the graft copolymer.

More preferably, the invention includes a composition comprising a blend of the graft copolymer and an engineering thermoplastic. To prepare a blend of an ETP and graft copolymer, the copolymer synthesis and blending can be achieved in the same reactor and solution process. In this case, excess ETP is used and the unreacted ETP is not removed from the reaction product. In such compositions, the graft copolymer is preferably present within a range of from 5 or 10 wt % to 20 or 25 or 30 or 35 or 40 wt % based on the weight of the combination of the graft copolymer and engineering thermoplastic. Such compositions would have improved properties over those of the polyolefin alone or ETP alone. For example, the HDT of the composition is no more than 10 or 20 or 30 or 40° C. lower than the HDT for the engineering thermoplastic alone. More preferably, the HDT may be within a range of from 150 or 160 or 170° C. to 200 or 220 or 240° C. Yet, the Young's Modulus is desirably within a range of from 500 or 1000 or 1500 to 2500 or 3000 or 3500 or 4000 MPa.

The various descriptive elements and numerical ranges disclosed herein for the inventive graft copolymer and compositions can be combined with other descriptive elements and numerical ranges to describe the invention; further, for a given element, any upper numerical limit can be combined with any lower numerical limit described herein. The features of the invention are demonstrated in the following non-limiting examples.

EXAMPLES

Tensile (Young's) Modulus:

Specimens were compression molded with ASTM D638 dimensions. Tests were performed on an Instron 5565 Mechanical Tester. Tensile experiments were carried out under 25 mm/min speed. Tensile modulus was experimentally determined from the slope of the initial linear portion of the stress-strain curve.

Impact Strength:

The impact strength was measured by notched Izod impact testing according to ASTM D256 Method.

Complex Viscosity:

Dynamic shear melt rheological data was measured with an Advanced Rheometrics Expansion System (ARES) using parallel plates (diameter=25 mm) in a dynamic mode under nitrogen atmosphere. For all experiments, the rheometer was thermally stable at 190° C. for at least 30 minutes before inserting a compression-molded sample of resin onto the parallel plates. To determine the samples viscoelastic behavior, frequency sweeps in the range from 0.01 to 385 rad/s were carried out at 190° C. under constant strain. Depending on the molecular weight and temperature, strains of 10% and 15% were used and linearity of the response was verified. A nitrogen stream was circulated through the sample oven to minimize chain extension or cross-linking during the experiments. A sinusoidal shear strain is applied to the material. If the strain amplitude is sufficiently small the material behaves linearly. It can be shown that the resulting steady-state stress will also oscillate sinusoidally at the same frequency but will be shifted by a phase angle $\delta$ with respect to the strain wave. The stress leads the strain by $\delta$. For purely elastic materials $\delta=0°$ (stress is in phase with strain) and for purely viscous materials, $\delta=90°$ (stress leads the strain by 90° although the stress is in phase with the strain rate). For viscoelastic materials, $0<\delta<90$. The shear thinning slope (STS) was measured using plots of the logarithm (base ten) of the dynamic viscosity versus logarithm (base ten) of the frequency. The slope is the difference in the log(dynamic viscosity) at a frequency of 100 s$^{-1}$ and the log(dynamic viscosity) at a frequency of 0.01 s$^{-1}$ divided by 4.

The complex shear viscosity ($\eta^*$) versus frequency ($\omega$) curves were fitted using the Cross model (see, for example, C. W. Macosco, Rheology: Principles, Measurements, and Applications, Wiley-VCH, 1994):

$$\eta^* = \frac{\eta_0}{1+(\lambda\omega)^{1-n}}.$$

The three parameters in this model are: $\eta_0$, the zero-shear viscosity; $\lambda$, the average relaxation time; and n, the power-law exponent. The zero-shear viscosity is the value at a plateau in the Newtonian region of the flow curve at a low frequency, where the dynamic viscosity is independent of frequency. The average relaxation time corresponds to the inverse of the frequency at which shear-thinning starts. The power-law exponent describes the extent of shear-thinning, in that the magnitude of the slope of the flow curve at high frequencies approaches 1-n on a log($\eta^*$)-log($\omega$) plot. For Newtonian fluids, n=1 and the dynamic complex viscosity is independent of frequency. For the polymers of interest here, n<1, so that enhanced shear-thinning behavior is indicated by a decrease in n (increase in 1-n).

GPC:

Polymer molecular weight (weight-average molecular weight, $M_w$, number-average molecular weight, $M_n$, and z-averaged molecular weight, $M_z$) and molecular weight distribution ($M_w/M_n$) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer. Three Polymer Laboratories PLgel 10 mm Mixed-B columns are used. The nominal flow rate is 0.5 cm$^3$/min and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 µm glass pre-filter and subsequently through a 0.1 µm Teflon filter. The TCB is then degassed with an online degasser before entering the SEC.

Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 135° C. The injection concentration can range from 1.0 to 2.0 mg/ml, with lower concentrations being used for higher molecular weight samples.

Prior to running each sample, the DRI detector and the injector are purged. Flow rate in the apparatus is then increased to 0.5 ml/minute, and the DRI allowed to stabilize for 8 to 9 hours before injecting the first sample. The LS laser is turned on 1 to 1.5 hours before running samples.

The concentration, c, at each point in the chromatogram is calculated from the DRI signal after subtracting the prevailing baseline, $I_{DRI}$, using the following equation:

$$c = K_{DRI} I_{DRI}/(dn/dc)$$

where $K_{DRI}$ is a constant determined by calibrating the DRI, and (dn/dc) is the same as described below for the LS analysis. The processes of subtracting the prevailing baseline (i.e., background signal) and setting integration limits that define the starting and ending points of the chromatogram are well known to those familiar with SEC analysis. Units on parameters throughout this description of the SEC method are such that concentration is expressed in g/cm$^3$, molecular weight is expressed in g/mole, and intrinsic viscosity is expressed in dL/g.

The light scattering detector is a Wyatt Technology High Temperature mini-DAWN. The polymer molecular weight, M, at each point in the chromatogram is determined by analyzing the LS output using the Zimm model for static light scattering (M. B. Huglin, Light Scattering from Polymer Solutions, Academic Press, 1971):

$$\frac{K_O c}{\Delta R(\theta)} = \frac{1}{MP(\theta)} + 2A_2 c.$$

Here, $\Delta R(\theta)$ is the measured excess Rayleigh scattering intensity at scattering angle $\theta$, c is the polymer concentration determined from the DRI analysis, $A_2$ is the second virial coefficient, $P(\theta)$ is the form factor for a monodisperse random coil (described in the above reference), and $K_o$ is the optical constant for the system:

$$K_O = \frac{4\pi^2 n^2 (dn/dc)^2}{\lambda^4 N_A}$$

in which $N_A$ is Avogadro's number, and (dn/dc) is the refractive index increment for the system. The refractive index, n, is 1.500 for TCB at 135° C. and $\lambda$=690 nm. In addition, $A_2$=0.0015 and (dn/dc)=0.104 for polyethylene in TCB at 135° C.; both parameters may vary with average composition of an ethylene copolymer. Thus, the molecular weight determined by LS analysis is calculated by solving the above equations for each point in the chromatogram; together these allow for calculation of the average molecular weight and molecular weight distribution by LS analysis.

A high temperature Viscotek Corporation viscometer is used, which has four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer at each point in the chromatogram, $(\eta_s)_i$, is calculated from the ratio of their outputs. The intrinsic viscosity at each point in the chromatogram, $[\eta]_i$, is calculated by solving the following equation (for the positive root) at each point i:

$$(\eta_s)_i = c_i[\eta]_i + 0.3(c_i[\eta]_i)^2$$

where $c_i$ is the concentration at point i as determined from the DRI analysis.

The branching index ($g'_{vis}$) is calculated using the output of the SEC-DRI-LS-VIS method (described above) as follows. The average intrinsic viscosity, $[\eta]_{avg}$ of the sample is calculated by:

$$[\eta]_{avg} = \frac{\sum c_i [\eta]_i}{\sum c_i}$$

where the summations are over the chromatographic slices, i, between the integration limits. The branching index g' is defined as:

$$g'_{vis} = \frac{[\eta]_{avg}}{kM_v^\alpha}$$

where the Mark-Houwink parameters k and $\alpha$ are given by k=0.00592, $\alpha$=0.463. The hydrogenated polybutadiene based modifier can be represented as a butane copolymer for these calculations with 12% butene. $M_v$ is the viscosity-average molecular weight based on molecular weights determined by LS analysis.

Experimental and analysis details not described above, including how the detectors are calibrated and how to calculate the composition dependence of Mark-Houwink parameters and the second-virial coefficient, are described by T. Sun, P. Brant, R. R. Chance, and W. W. Graessley (34(19) *Macromolecules* 6812-6820 (2001)).

General Preparation of Vinyl/Vinylidene-Terminated Polyethylenes.

A 1 L stainless autoclave was charged with tri-n-octyl-aluminum (Aldrich, 1.0 mL, 0.1 M in hexane) and isohexane (500 mL). The reactor was heated to the desired temperature and then ethylene was added. After reaching equilibration, a toluene (5 mL) solution of pre-catalyst A (2000 nmol) and tetrakis(perfluoronaphthalen-2-yl)borate (2400 nmol) was injected into the reactor. The polymerization was allowed to proceed for the time indicated, and then the reactor cooled to room temperature. After the pressure was vented the reactor contents were transferred into a glass container, volatiles evaporated and the solid product dried under reduced pressure. Process conditions and characterization are summarized in Tables 1 and 2. GPC-3D data is relative to linear polyethylene standards.

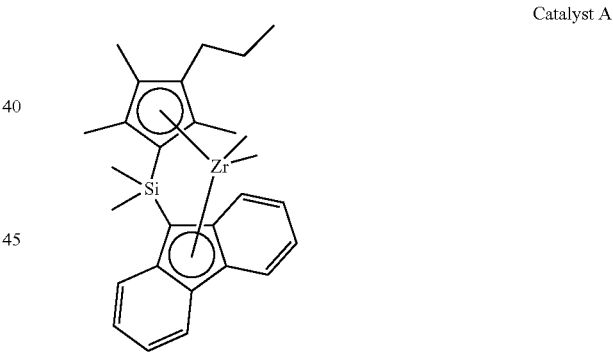

Catalyst A

TABLE 1

Vinyl/vinylidene-terminated polymers. Samples with NMR % vinyls labeled as "high" indicate that only vinyl end groups were observed.

| sample | product | hexane (mL) | C2 (psi) | T (° C.) | Time (min) | Yield (g) | NMR % vinyls | NMR Mn (kDa) | HNMR wt % hexene |
|---|---|---|---|---|---|---|---|---|---|
| 1 | PE | — | 100 | 100 | 38 | 28.1 | 89.6 | 42.8 | ND |
| 2 | PE | — | 50 | 100 | 30 | 13.4 | 90.4 | 49.7 | ND |
| 3 | PE | — | 150 | 100 | 30 | 17.3 | 84.1 | 58.1 | ND |
| 4 | PE | — | 100 | 90 | 30 | 11.6 | high | 83.7 | ND |
| 6 | EH | 10 | 100 | 100 | 27 | 10.2 | high | 70.8 | 2.9 |
| 7 | EH | 20 | 75 | 80 | 12 | 12.6 | high | 68.1 | 5.8 |

ND = not determined

TABLE 2

GPC data for vinyl/vinylidene-terminated polymers.

| sample | product | GPC-3D calc. mass (%) | GPC-3D LS Mn | GPC-3D LS Mw | GPC-3D LS Mz | GPC-3D g' (Vis Ave) | GPC-3D Mn DRI | GPC-3D Mw DRI | GPC-3D Mz DRI |
|---|---|---|---|---|---|---|---|---|---|
| 1 | PE | 90  | 81,230 | 202,400 | 485,306 | 0.97 | 50,692 | 171,410 | 390,249 |
| 2 | PE | 91  | 85,052 | 176,280 | 391,366 | 0.99 | 68,469 | 160,332 | 365,149 |
| 3 | PE | 91  | 85,640 | 170,967 | 397,932 | 0.99 | 68,435 | 156,528 | 365,567 |
| 4 | PE | 105 | 76,474 | 157,419 | 265,389 | 0.99 | 69,495 | 167,916 | 438,345 |
| 6 | EH | 97  | 72,082 | 143,553 | 234,435 | 1.00 | 54,282 | 130,769 | 229,122 |
| 7 | EH | 97  | 81,243 | 158,630 | 238,869 | 0.98 | 65,178 | 141,342 | 250,595 |

Representative Synthesis and Properties of PPE-g-PE Graft Copolymer.

A typical synthetic procedure is described here. A 250 mL reaction flask was charged with 0.825 g PPE ($M_n$=15K determined by GPC referenced to polystyrene), 4.675 g VTPE ($M_n$=85K and 3 wt % hexene comonomer determined by NMR) and 100 mL 1,2-dichlorobenzene (o-DCB). The mixture was heated to 120° C. to fully dissolve the reactants. The acid catalyst was then slowly added to the reaction mixture, which immediately turned an orange color. The reaction was allowed to proceed overnight. The reaction mixture was precipitated in isopropanol (IPA), resulting in a white powder that was filtered and dried in a vacuum oven. The white powder was suspended in 500 mL dichloromethane (DCM) and vigorously stirred for 2 hours to remove any unreacted PPE. (DCM extraction ensures the complete removal of unreacted PPE because PPE is soluble in DCM while neither PE nor PPE-PE copolymer is soluble in DCM.) The white powder was filtered and washed with fresh DCM several times. The product was further purified by Soxhlet extraction with DCM overnight and dried in a vacuum oven at 60° C. until reaching constant weight. The final recovered product weighed 5.43 g (99% yield).

Figure 2A:
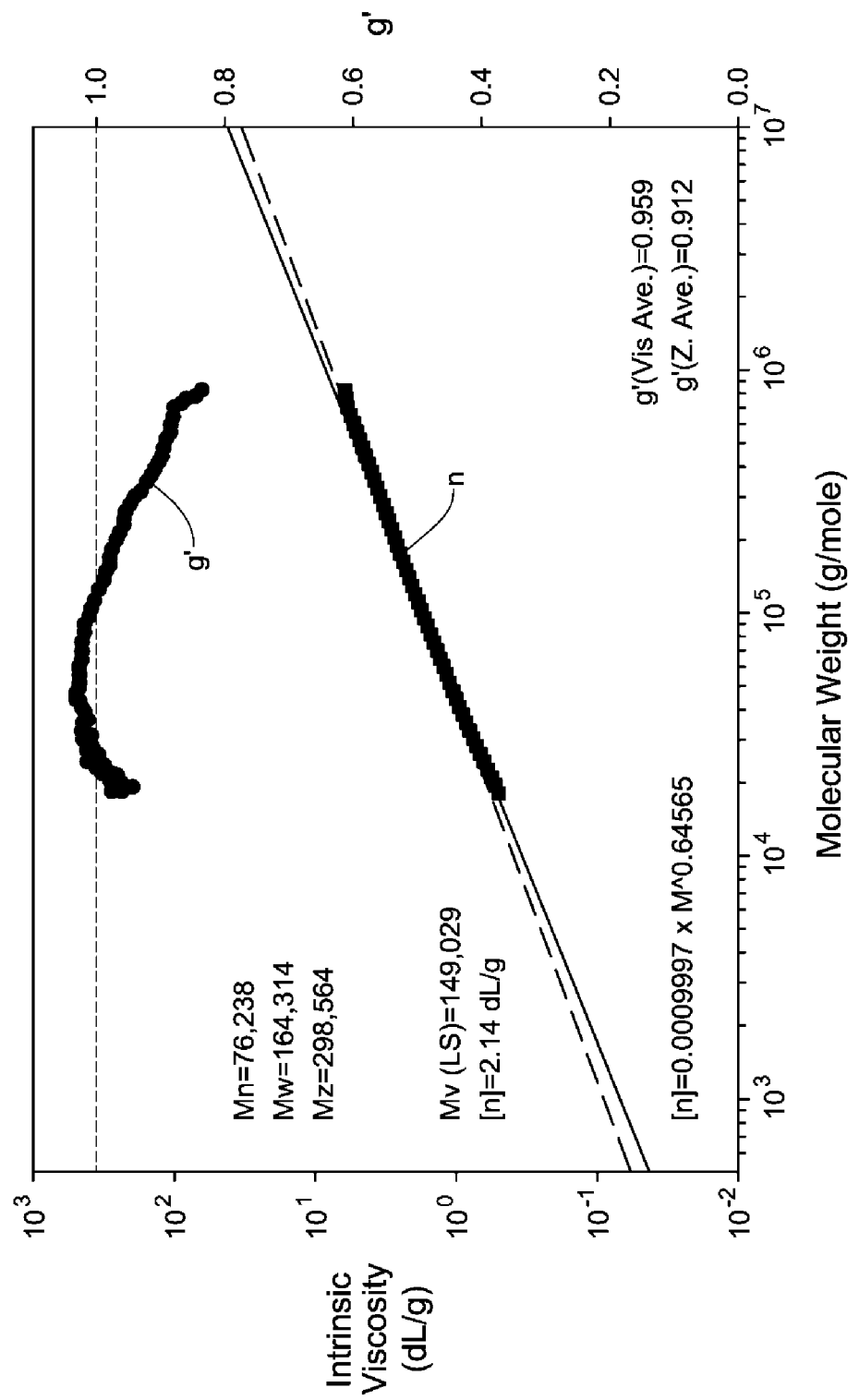
FIG. 2. HT GPC-3D of (a) vinyl/vinylidene-terminated polyethylene (VTPE) and (b) PPE-PE copolymer. The traces are from viscosity detector.
Figure 2B:
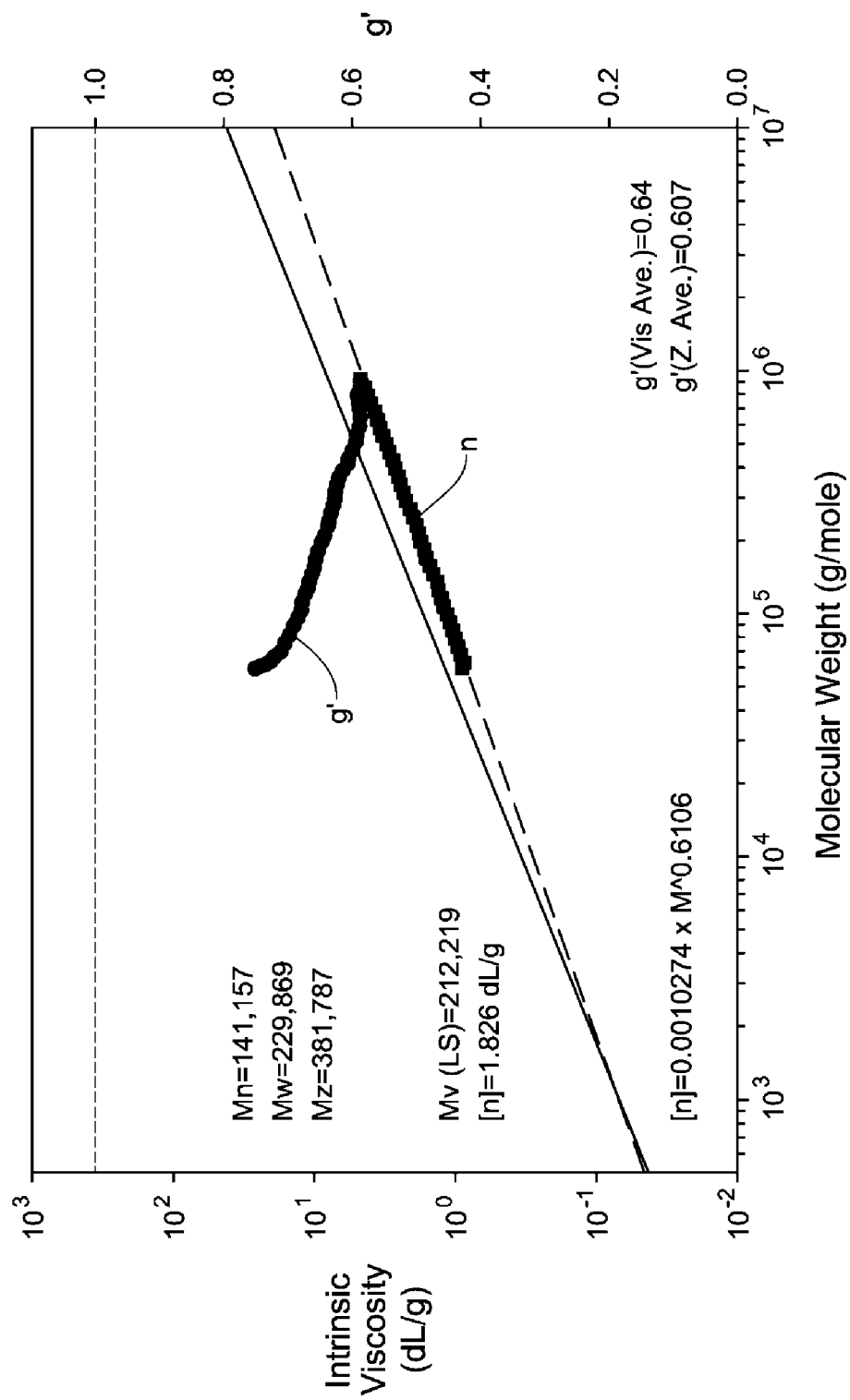
Figure 3A:
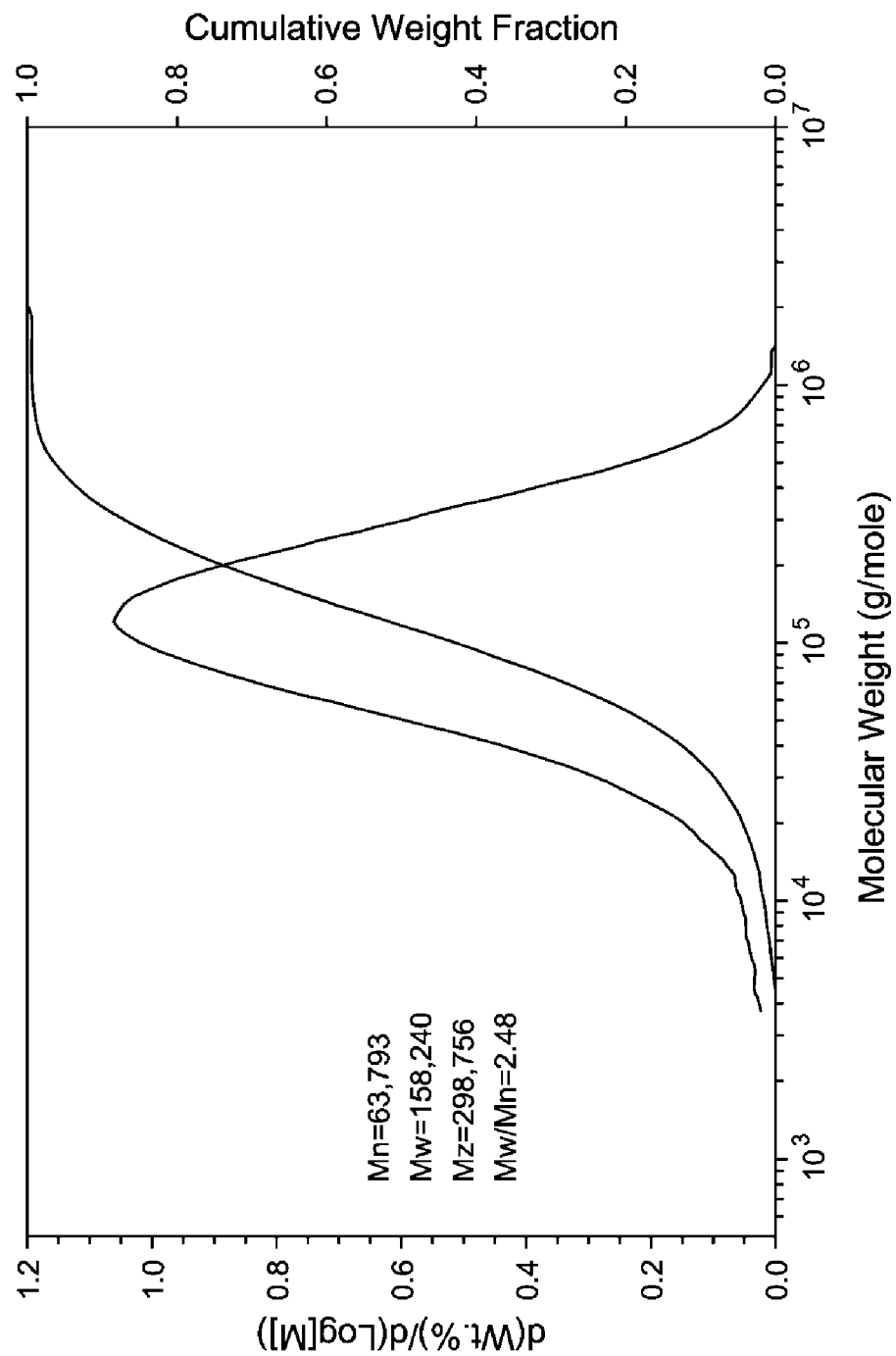
FIG. 3. HT GPC-3D of (a) VTPE and (b) PPE-PE copolymer. The traces are from refractive index detector.
Figure 3B:
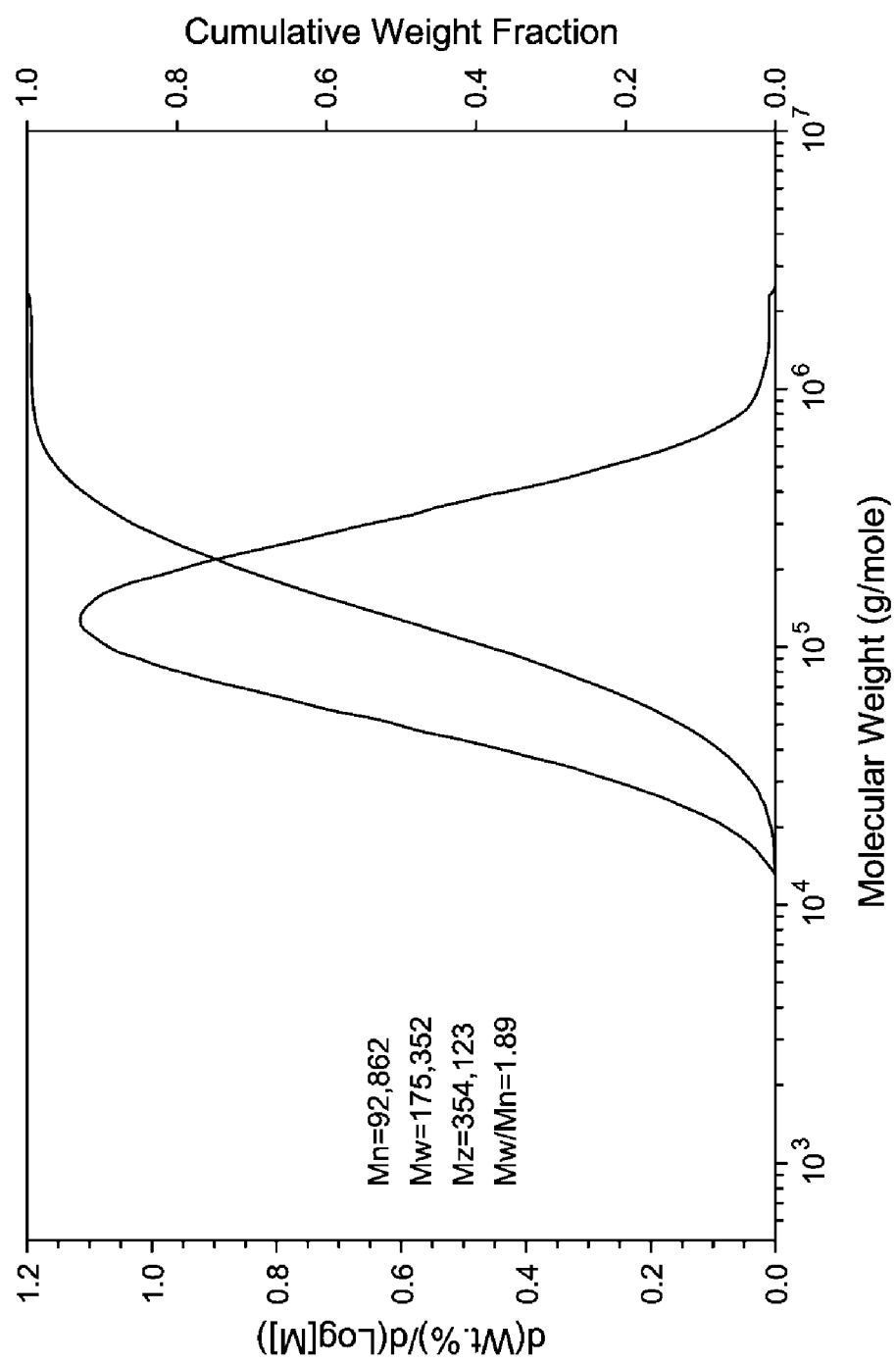

The $^1$H NMR spectrum of the PPE-PE copolymer after DCM extraction in tetrachloroethane-$d_2$ (TCE-$d_2$) at 120° C. shown in FIG. 1 indicates the absence of the vinyl end group in the original VTPE and the existence of PPE's signature peaks (ArH, 6.4 ppm, ArCH$_3$, 2.1 ppm). High-temperature triple-detector gel permeation chromatography (HT GPC-3D) traces of the copolymer and the starting VTPE are shown in FIG. 2 and FIG. 3 respectively. The PPE-PE copolymer showed an increased molecular weight, decreased branching index (g'), and mono-modal distribution, supporting that a uniform copolymer was formed, rather than a physical blend of the starting materials. Based on the molecular weights of copolymer and starting VTPE, an average of one to two PE branches (85K $M_n$) were grafted onto each PPE backbone (15K $M_n$).

Thermal Mechanical Analysis (TMA), where the probe was set at the penetration mode, demonstrated that the PPE-g-PE is free of low-temperature "softening step" at about 50° C., which is typically observed in PE samples. This is evidence to support the enhanced thermal property of the new graft copolymer. PPE-g-PE sample and control LLDPE sample were compression molded respectively and their mechanical properties were listed in Table 3. In the tensile test, PPE-g-PE retained PE's typical elongation (about 1000%) but demonstrated much improved stiffness (Young's Modulus 271 MPa vs. PE's 77 MPa). The notched Izod test at −30° C. indicated significant improvement of impact strength, in comparison to PPE, which typically has a low impact strength.

TABLE 3

Mechanical properties of the PPE-g-PE, LLDPE and PPE

|  | Young's Modulus (MPa) | Tensile Stress at Yield (MPa) | Izod Impact Strength at −30° C. (J/m) |
|---|---|---|---|
| PPE-g-PE | 271 | 18 | 176 |
| PE | 77 | 11 | 450 (23° C.) |
| PPE | N/A | N/A | 53 (−17° C.)* |

*Literature data (Polymer Data Handbook, 2nd ed., J. E. Mark ed., Oxford Univ. Press: New York, 2009, 534)

Control reactions, in which PPE was not present while other conditions were kept the same, were carried out. Under the same reaction conditions, VTPO did not undergo oligomerization, affording a product with identical molecular weight, rheological and mechanical properties to the starting VTPO. This set of control reactions confirmed the importance of PPE in forming PPE-VTPO copolymer without undesired VTPO side reactions.

Another set of control reactions, in which POs without unsaturated termination replaced VTPOs as the reactant, were also carried out. When attempting to process the reaction products, the products showed clear phase separation of large melted clear PO domains and large unmelted white PPE domains, indicating a physical blend nature rather than formation of copolymer. This is in a drastic contrast to the homogeneous appearance of processed PPE-PE copolymer. This set of control reactions confirmed the importance of unsaturated termination of PO in forming the copolymer.

Blends

Figure 4:
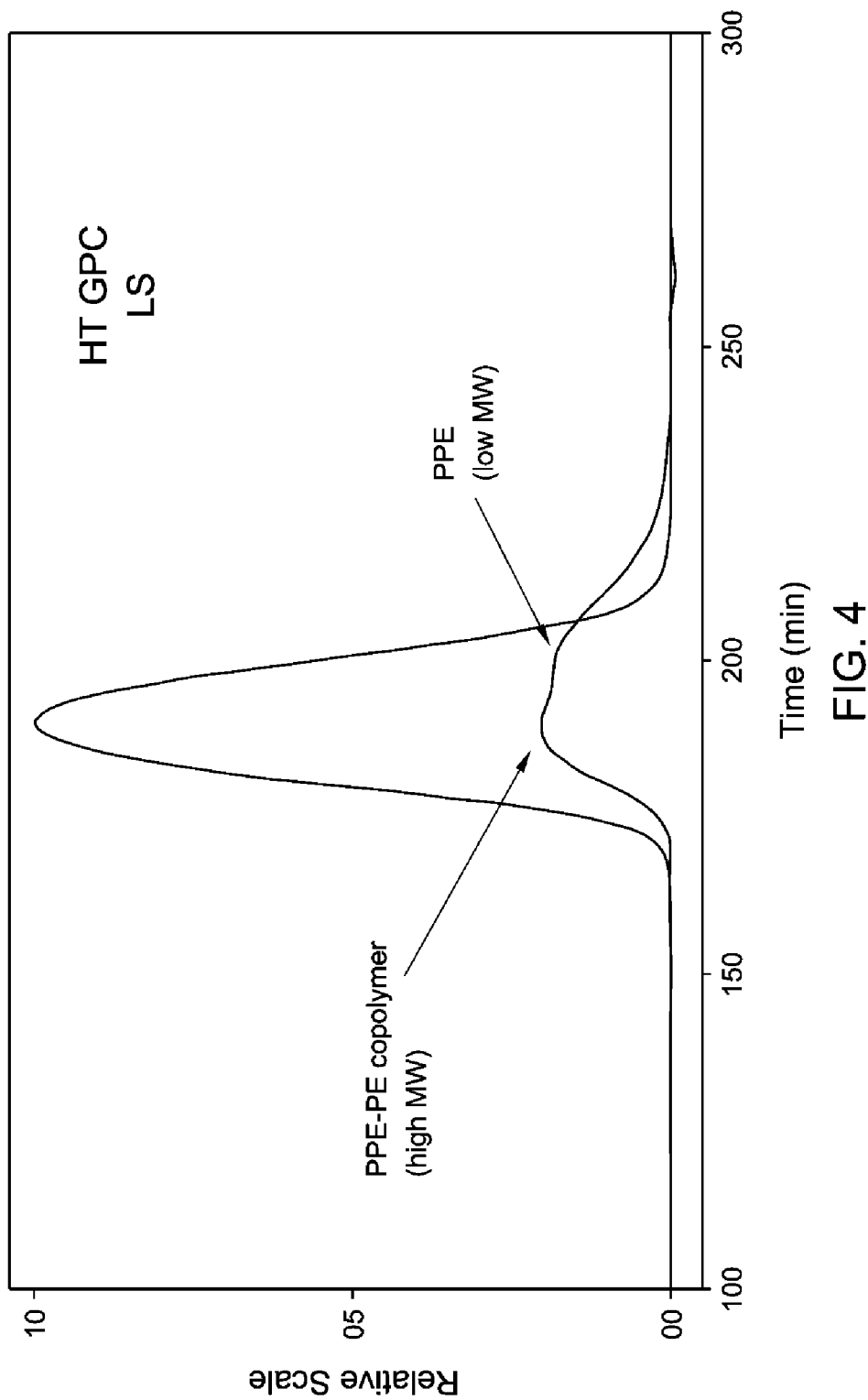
FIG. 4. HT GPC of the PPE/PPE-PE blend by one-pot synthesis/blending process. The traces are from light scattering detector.

To prepare a blend of PPE and PPE-VTPO copolymer, copolymer synthesis and blending can be achieved in a one-pot solution process. In this case, excess PPE is used and the unreacted PPE is not removed. A typical synthesis involved 85 wt % PPE ($M_n$=15K) and 15 wt % VTPE ($M_n$=68K, 5.8% hexene comonomer) reacted under the abovementioned conditions but without DCM washing after the reaction. Because PPE is in excess, it is safe to assume that at most one VTPE is grafted onto each PPE backbone, resulting in a blend with 82 wt % PPE and 18 wt % PPE-PE copolymer. To test this, the product was extracted by tetrahydrofuran (THF). The THF-soluble portion (PPE) accounts for 78 wt % and the THF-insoluble portion (PPE-PE copolymer) accounts for 22 wt %, which is reasonably close to the theoretical calculations. The extraction results and GPC results of the extracts are summarized in Table 4. HT-GPC traces for the one-pot blend are shown in FIG. 4. From the light scattering detector, the blend showed a bimodal distribution, with a high molecular weight peak representing the PPE-PE copolymer and a low molecular weight peak representing the PPE.

TABLE 4

Extraction of PPE/PPE-PE blend.

|  | THF-soluble (PPE) | THF-insoluble (PPE-PE copolymer) |
|---|---|---|
| Extraction (wt %) | 78 | 22 |
| Theoretical (wt %) | 82 | 18 |
| GPC $M_n$ (kDa) | 16 | ND |
| Theoretical $M_n$ (kDa) | 15 | 83 |

Properties

Thermal.

Figure 5A:
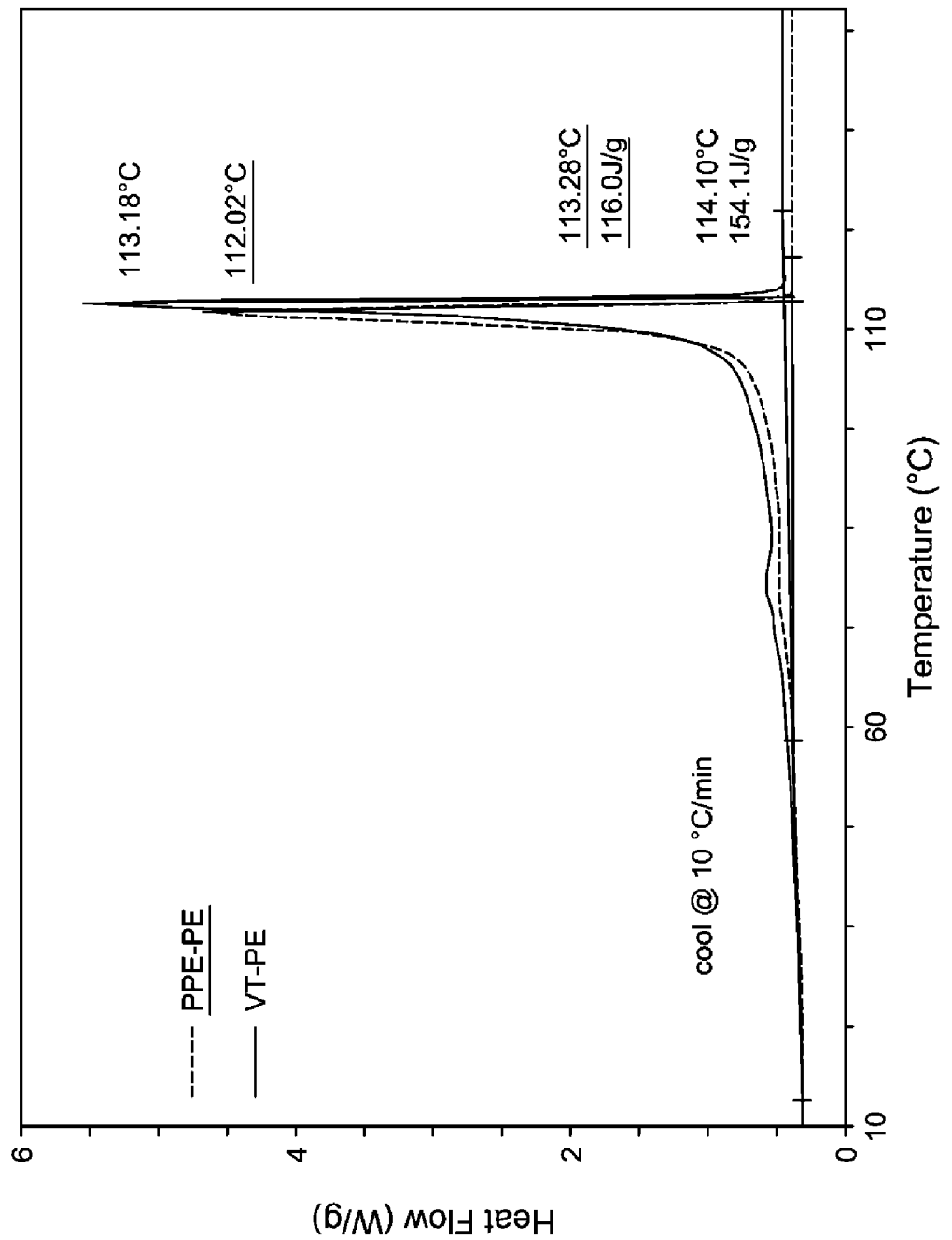
FIG. 5. DSC of PPE-PE copolymer (dashed line) and starting VTPE (solid line).
Figure 5B:
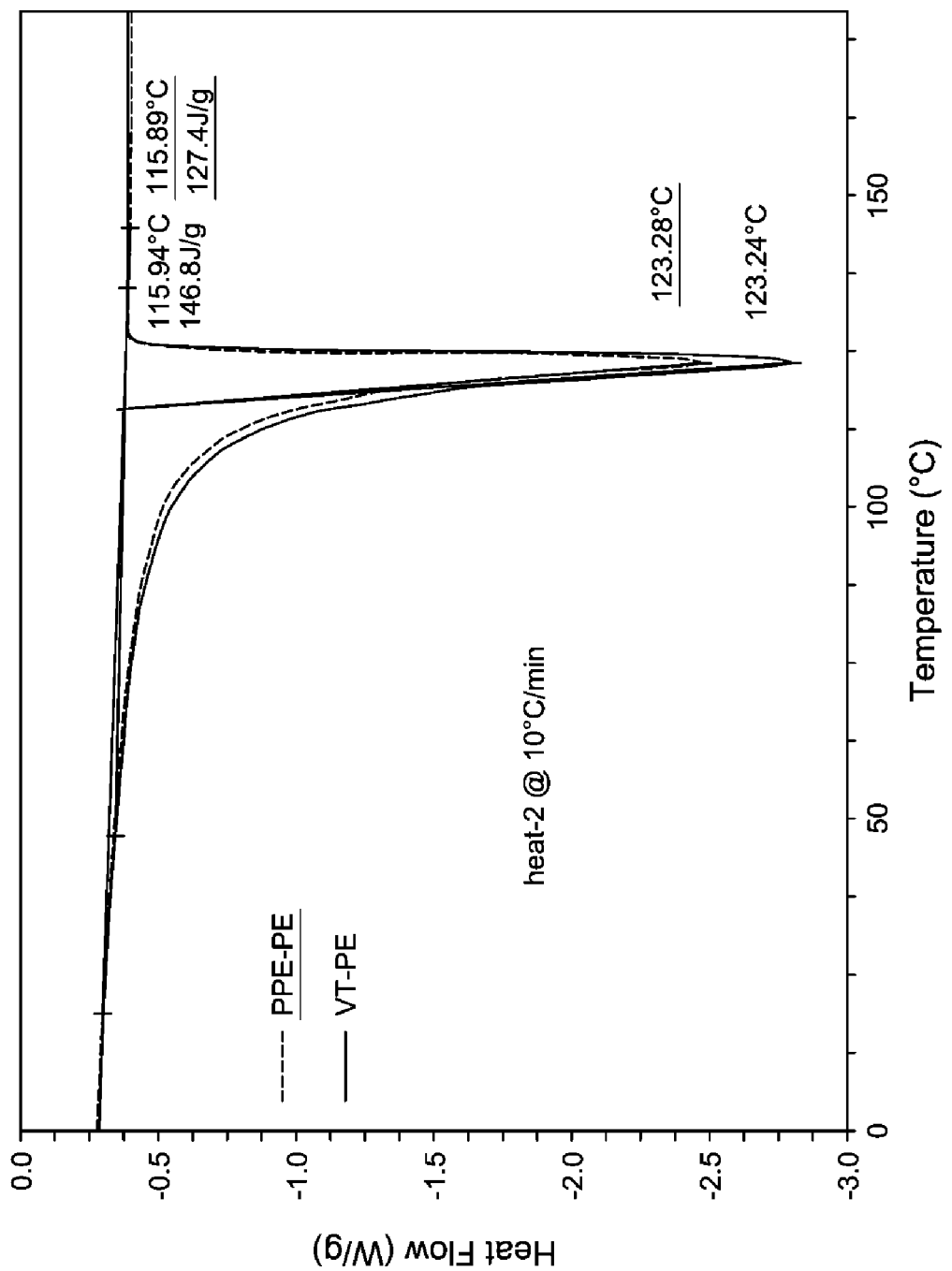

The amorphous PPE segment in the PPE-PE copolymer did not affect PE crystallization. The PPE-PE copolymer retained the same melting temperature ($T_m$) and crystallization temperature ($T_c$) as the starting VTPE but with reduced heat of fusion ($\Delta H_f$). The reduction of $\Delta H_f$ is an indication of the incorporation of amorphous PPE and can be used to calculate the PPE and PE ratio in the copolymer. The result calculated in this way (14 wt % PPE) well matched the calculation from reaction feed ratio (15 wt % PPE). An overlay of the differential scanning calorimetry (DSC) traces of PPE-PE copolymer and starting VTPE is shown in FIG. 5.

Rheology.

Figure 6A:
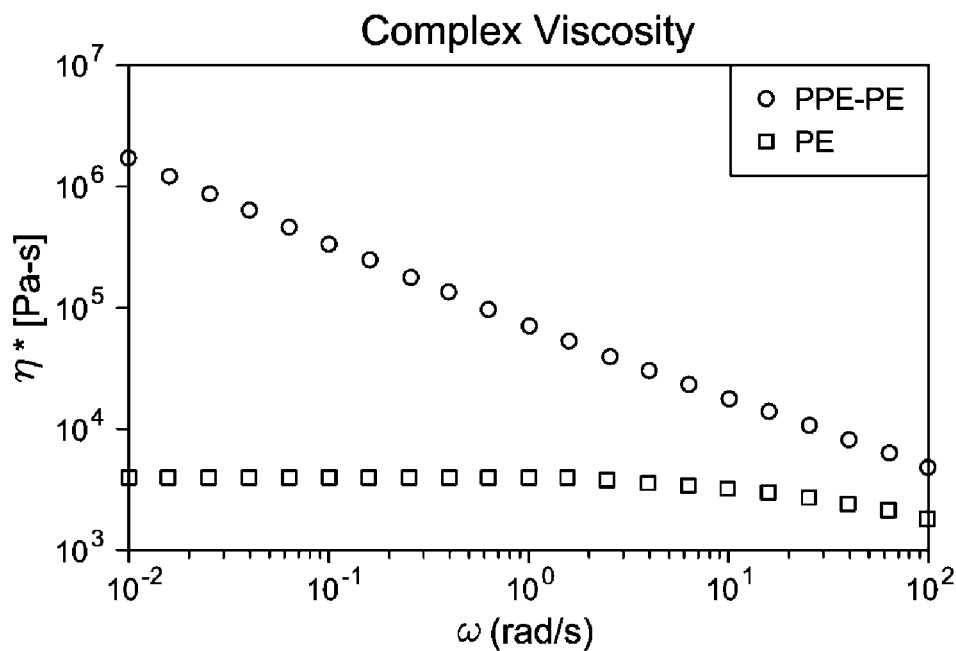
FIG. 6. Melt rheology measured by SAOS at 190° C., (a) complex viscosity plot; (b) van Gurp-Palmen plot.
Figure 6B:
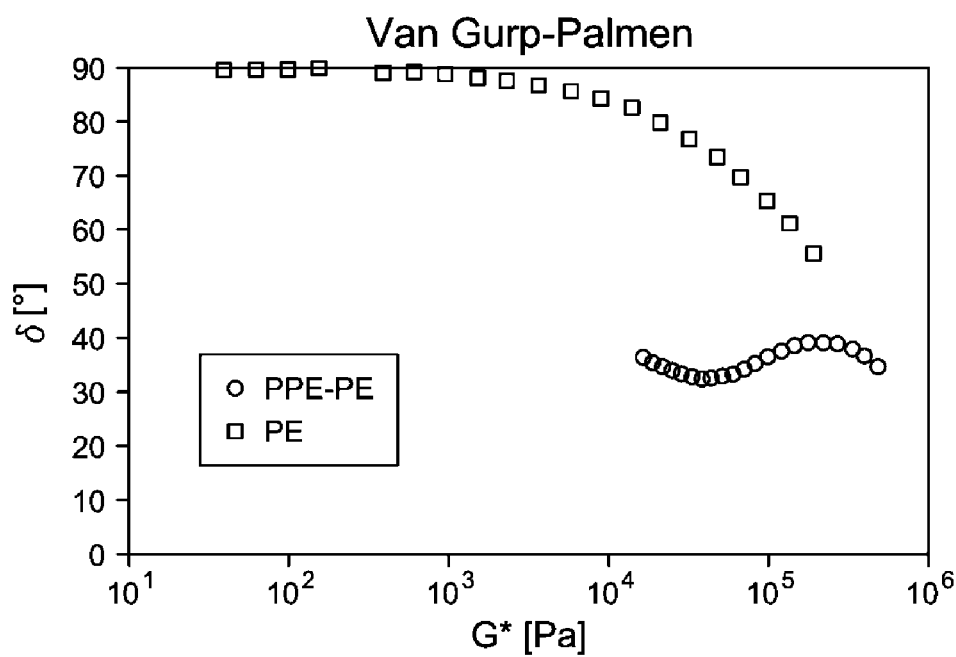

The melt rheology of the PPE-PE copolymer and the LLDPE were measured by small amplitude oscillatory shear (SAOS) at 190° C. PPE could not be analyzed at this temperature because of PPE's high glass transition temperature ($T_g$) and high viscosity. Incorporation of PE significantly lowered the PPE viscosity, making measurement and processing possible. As shown in the complex viscosity plot (FIG. 6a), the PPE-PE copolymer exhibits a high viscosity at low shear rates, indicative of good melt strength, and strong shear thinning behavior, which should translate into easy processing (low viscosity at greater than 100 s$^{-1}$ shear rate). Over the same shear rate range, the viscosity of the PE melt was generally much lower and gave only insignificant thinning presented. From the van Gurp-Palmen plot (FIG. 6b), the PPE-PE copolymer demonstrated comb-like characteristics with high branching index and exhibited long-chain branching (LCB) behavior, consistent with the GPC-3D results. In addition to the good processability demonstrated by the PE-rich PPE-PE copolymer itself, it is expected to function as an additive to improve the PE processability.

Mechanicals.

Figure 7A:
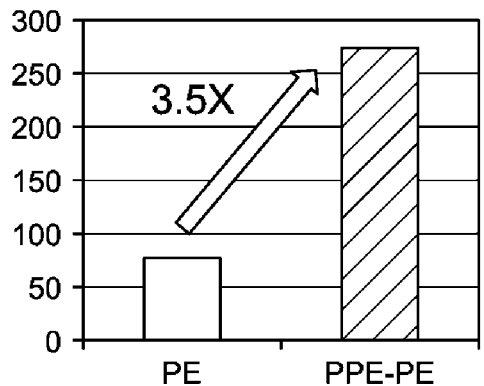
FIG. 7. Mechanical properties of PPE-PE copolymer, (a) tensile modulus; (b) notched Izod impact strength at −30° C. For comparison, the Young's modulus of PPE is about 2,700 MPa, and the notched Izod impact strength at −30° C. for LLDPE is about 400 J/m.
Figure 7B:
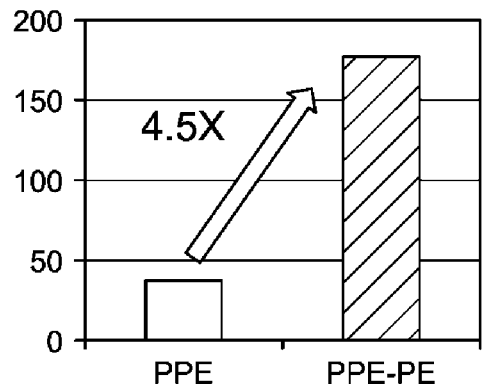

The PE-rich PPE-PE copolymer (85 wt % PE and 15 wt % PPE) prepared in this study was more than 3× stiffer than LLDPE, and, while less tough than LLDPE, it was much tougher than PPE. These properties were measured by tensile modulus (FIG. 7a) and notched Izod impact strength at −30° C. (FIG. 7b), respectively.

PPE/PPE-PE Blends.

Figure 8:
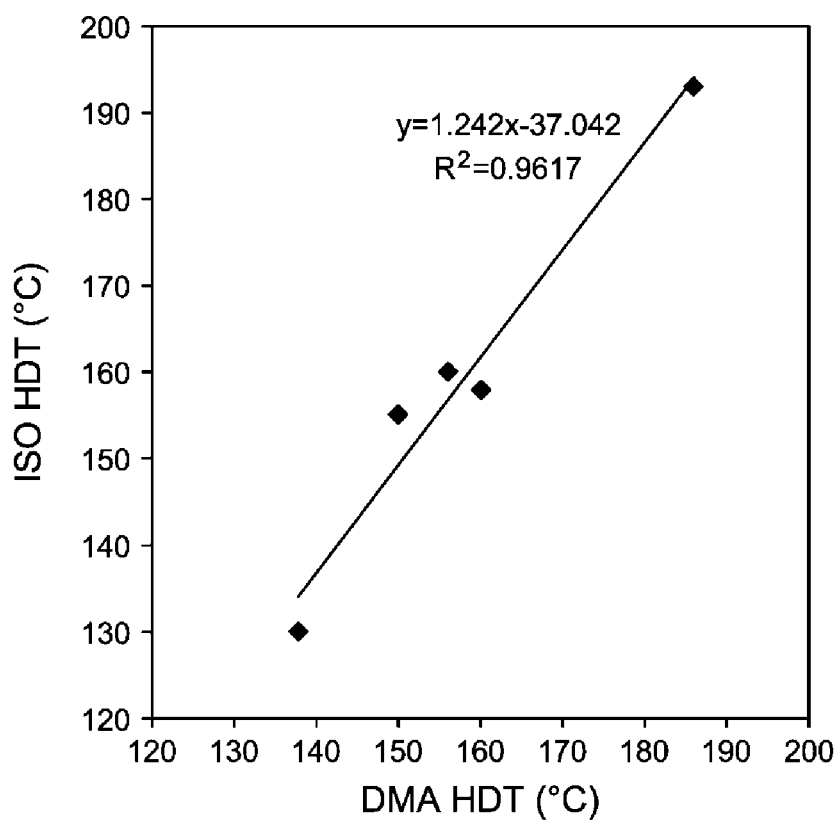
FIG. 8. DMA HDTs and ISO HDTs showed good correlation. DMA HDTs are the onset temperatures of tan delta. ISO HDTs are provided by SABIC (at 0.45 MPa, ISO 75/Be).

Several commercial PPE alloys were identified and acquired from SABIC in order to compare the inventive PPE/PPE-PE blends with current technology. Among these, PPO731 (Noryl™ 731 from SABIC) was used as the benchmark because it is the most common unfilled grade (i.e., not fiber reinforced); it contains about 50 wt % PS. (PPE is also known as poly(phenylene oxide), abbreviated as "PPO") Relative HDT of the materials was of interest. However, because the standard (ISO) method to measure HDT requires relatively large sample quantities, a method of HDT measurement by dynamic mechanical analyzer (DMA) was developed. The onset temperature of a drop in loss angle (tan delta) with increasing temperature was chosen as representing the HDT, because this showed good correlation with the HDT obtained from the ISO method (FIG. 8). This allowed us to obtain reliable HDT data on experimental samples at small quantities. Some relevant properties for PPO731 are the following: Tensile Stress at yield (50 mm/min, ISO 527) is 55 MPa, the Tensile Modulus (1 mm/min, ISO 527) is 2300 MPa, the Izod Impact strength (−30° C., ISO 180/1A) was 5 kJ/m$^2$, the Flexural Modulus (2 mm/min, ISO 178) was 2200 MPa, and the Vicat Softening Temperature, Rate A/50 (ISO 306) is 145° C.

Figure 9:
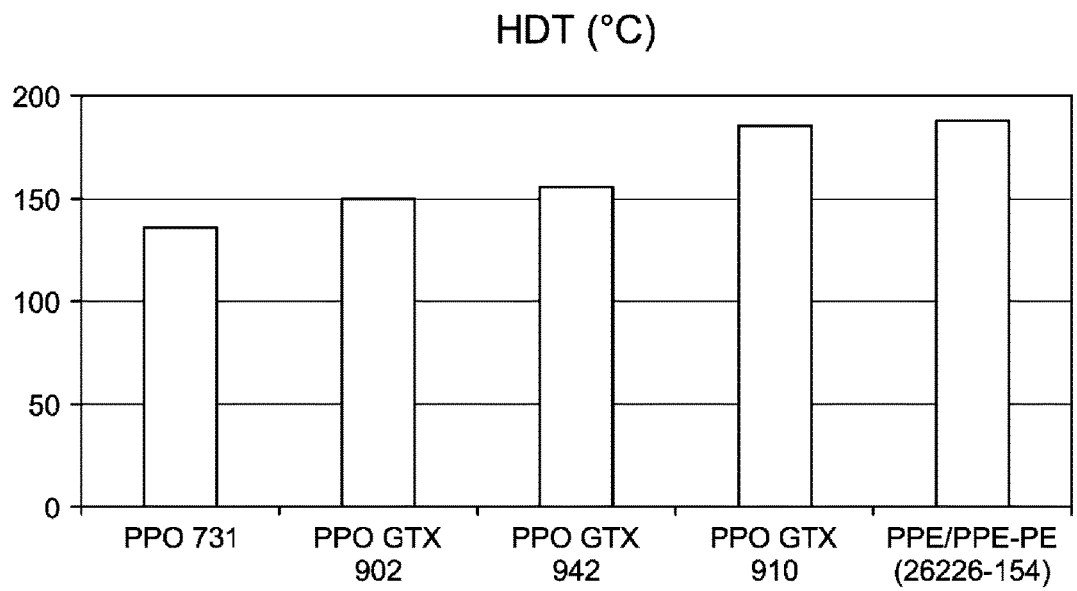
FIG. 9. DMA HDT of PPE/PPE-PE blend and comparison to HDTs of commercial PPE alloys.

A comparison of the HDT of the PPE/PPE-PE blend (82 wt % PPE and 18 wt % PPE-PE copolymer) to several commercial PPE alloys is shown in FIG. 9. (The GTX grades are alloys with Nylon™.) The inventive blend has the highest HDT of all the materials examined; in particular, it is about 50° C. higher than that of PPO731. This value is comparable to the HDT of neat PPE reported in the literature (J. Polym. Sci., Polym. Symp. 3755 (1968)), which means by incorporating a small amount of low-cost PO, the PPE-rich alloy becomes processable and the outstanding thermal property of PPE is retained.

Figure 10:
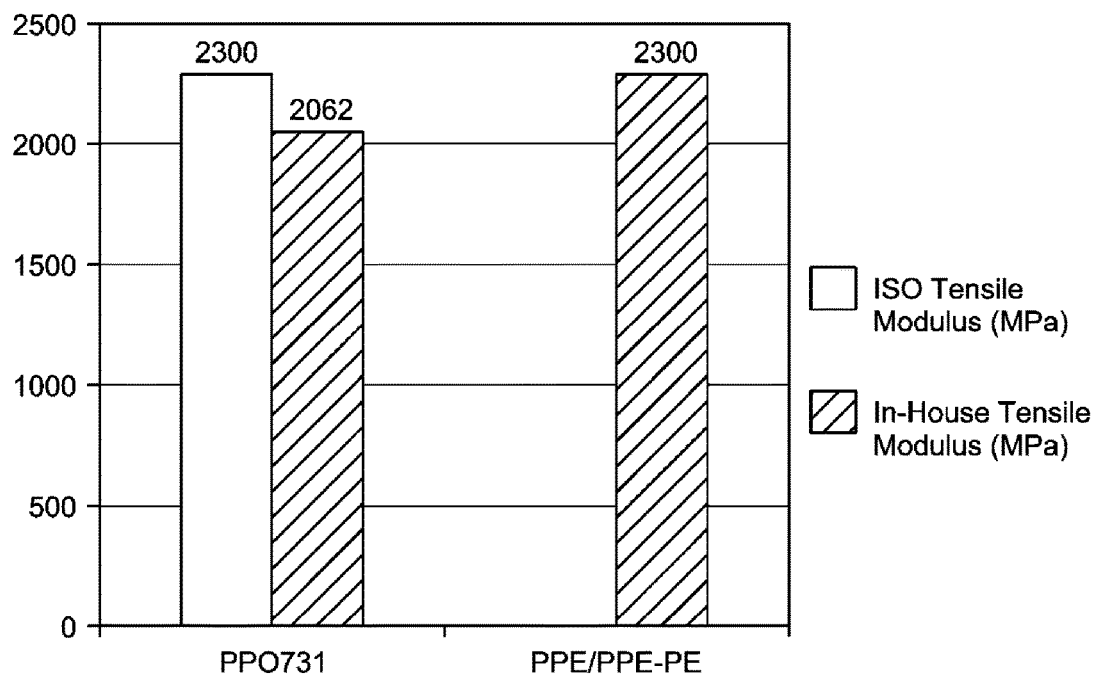
FIG. 10. Tensile modulus of PPE/PPE-PE blend and comparison to PPO731 (the ISO tensile modulus of PPO731 is provided by SABIC and measured by ISO 527 method).

The tensile modulus of the PPE/PPE-PE blend was also measured and compared to PPO731. To confirm the in-house test method was reliable, the tensile modulus of PPO731 measured in the lab was first compared to its value measured using an ISO method (from SABIC Technical Datasheet) and a good correlation was demonstrated. As shown in FIG. 10, the tensile modulus of the blend is comparable to the benchmark PPO731, indicating the inventive low-cost processable PPE-rich alloy also retained stiffness. The observation in handling the blend samples was that they are extremely tough and difficult to break, in contrast to PPE which was quite brittle. This is in line with expectations, since addition of a soft segment typically improves the toughness of a hard polymer.

Now, having described the various features of the inventive graft copolymer and the vinyl/vinylidene terminated polyolefin and engineering thermoplastic used to make it, and compositions comprising the graft copolymer, described here in numbered paragraphs is:

P1. A graft copolymer comprising polyolefin and engineering thermoplastic components, wherein the thermoplastic component is a polymer comprising heteroatoms or heteroatom containing moieties in its backbone and phenyl or substituted phenyl groups, the polyolefin component covalently bound to the engineering thermoplastic component.

P2. The graft copolymer of paragraph 1, wherein the engineering thermoplastic has a HDT of at least 100° C. or 120° C. or 140° C. or 160° C.

P3. The graft copolymer of paragraphs 1 or 2, wherein the polyolefin component has a weight average molecular weight (Mw) within a range from 300 or 600 or 1000 or 5000 g/mole to 80,000 or 100,000 or 200,000 or 300,000 g/mole.

P4. The graft copolymer of any one of the preceding numbered paragraphs, wherein the ratio of the polyolefin component to the engineering thermoplastic component in the graft copolymer is within a range of from 99:1 or 80:20 or 55:45 to 45:55 or 20:80 or 1:99. For highly processable compositions, the desirable range is from 99:1 to 70:30. For compositions with high HDT, the desirable range is from 70:30 to 1:99.

P5. The graft copolymer of any one of the preceding numbered paragraphs, wherein the graft copolymer has the structure:

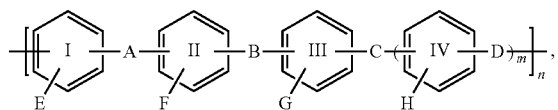

wherein each I, II, III, and IV are, independently, 1,2-phenyl, 1,3-phenyl or 1,4-phenyl, any of which may be substituted with one or more electron-donating substituents;

at least one of A, B, C, and D are, independently, an oxygen, nitrogen, sulfur, or phosphorous atom, or a moiety comprising oxygen, nitrogen, sulfur, phosphorous, or a combination thereof;

at least one of E, F, G, and H are one, two or three polyolefins bound to I, II, III, and IV, respectively, and having a weight average molecular weight of at least 300 g/mole; and m is an integer within the range from 1 to 10, and n is an integer within the range from 10 to 500.

P6. The graft copolymer of paragraph 5, wherein the electron-donating substituents are selected from the group consisting of $C_1$ to $C_{10}$ alkyls, $C_1$ to $C_{10}$ alkoxys, $C_1$ to $C_{10}$ mercaptans, chlorine, bromine, iodine, hydroxyl, and combinations thereof.

P7. The graft copolymer of any one of paragraphs 5-6, wherein the A, B, C, and D substituents are selected from the group consisting of $C_1$ to $C_{10}$ carboxy-containing moieties, $C_1$ to $C_{10}$ imido-containing moieties, $C_1$ to $C_{10}$ sulfido-containing moieties, sulfur, sulfide, carboxy, carboxylate, imido, nitrogen, and combinations thereof.

P8. The graft copolymer of any one of paragraphs 5-7, wherein the A, B, C, and D substituents are selected from the group consisting of —$CH_2$—NH—CO—$(CH_2)_4$—$CH_2$—, —OCOO—, CO—, pyromellitic diimidos, —$SO_2$—, sulfur, oxygen, nitrogen, phosphorous, and combinations thereof.

P9. The graft copolymer of any one of the preceding paragraphs, wherein the ratio of the polyolefin component to the engineering thermoplastic component in the graft copolymer is within a range of from 99:1 or 80:20 or 55:45 to 45:55 or 20:80 or 1:99. For highly processable compositions, the desirable range is from 99:1 to 70:30. For compositions with high HDT, the desirable range is from 70:30 to 1:99.

P10. The graft copolymer of any one of the preceding paragraphs, wherein the graft copolymer is the reaction product of an engineering thermoplastic having at least one phenylene in the polymer backbone, and a vinyl/vinylidene terminated polyolefin having a weight average molecular weight of at least 300 g/mole.

P11. The graft copolymer of paragraph 10, wherein the vinyl/vinylidene terminated polyolefin is selected from polyethylenes, polypropylenes, ethylene-propylene copolymers, polyisobutylenes, polydienes, propylene-based elastomers, ethylene-based plastomers, and combinations thereof.

P12. The graft copolymer of any one of paragraphs 10-11, wherein the vinyl/vinylidene terminated polyolefin has a weight average molecular weight ($M_w$) within a range from 300 or 600 or 1000 or 5000 g/mole to 80,000 or 100,000 or 200,000 or 300,000 g/mole.

P13. The graft copolymer of any one of paragraphs 10-12, wherein the engineering thermoplastic has a weight average molecular weight ($M_w$) within a range from 5,000 or 10,000 or 15,000 g/mole to 20,000 or 30,000 or 50,000 or 80,000 g/mole.

P14. The graft copolymer of any one of paragraphs 10-13, wherein the reaction is facilitated with a Friedel-Crafts type of catalyst at a temperature within the range from 80 or 100° C. to 140 or 160 or 180 or 200° C.

P15. The graft copolymer of any one of paragraphs 10-14, wherein the Young's Modulus of the graft copolymer is at least 2 times or 3 times the value of the vinyl/vinylidene terminated polyolefin.

P16. The graft copolymer of any one of paragraphs 10-15, wherein the Notched Izod Impact strength of the graft copolymer is at least 2 times or 3 times or 4 times the value for the engineering thermoplastic.

P17. The graft copolymer of any one of paragraphs 10-16, wherein for the engineering thermoplastic, A, B, C, and D is oxygen, and I, II, III, and IV are 2,6-dimethyl-1,4-phenyl, and m is 1.

P18. The graft copolymer of paragraph 17, having a branching index, $g_{vis\text{-}avg}$, of less than 0.80 or 0.70 or 0.60.

P19. The graft copolymer of any one of paragraphs 17-18, wherein the z-average molecular weight, $M_v$ is within a range from 50,000 or 80,000 or 100,000 or 200,000 or 250,000 or 300,000 or 350,000 g/mole to 400,000 or 450,000 or 500,000 or 550,000 or 600,000 g/mole.

P20. The graft copolymer of any one of paragraphs 17-19, wherein the Young's Modulus is within a range of from 250 or 260 MPa to 280 or 300 or 320 MPa.

P21. A composition comprising a blend of the graft copolymer any one of the preceding paragraphs and an engineering thermoplastic.

P22. The composition of paragraph 21, wherein the graft copolymer is present within a range of from 5 or 10 wt % to 20 or 25 or 30 or 35 or 40 wt % based on the weight of the combination of the graft copolymer and engineering thermoplastic.

P23. The composition of paragraphs 21-22, wherein the HDT of the composition is no more than 10 or 20 or 30 or 40° C. lower than the HDT for the engineering thermoplastic.

P24. The composition of paragraphs 21-23, wherein the HDT is within a range of from 150 or 160 or 170° C. to 200 or 220 or 240° C.

P25. The composition of paragraphs 21-24, wherein the Young's Modulus is within a range of from 500 or 1000 or 1500 to 2500 or 3000 or 3500 or 4000 MPa.

P26. The composition of paragraphs 21-25, further comprising a polyolefin.

P27. A structural component comprising the graft copolymer or composition of any one of the preceding paragraphs.

Also described is the use of the graft copolymer of any one of paragraphs 1-20 in a structural component. Also described is the use of a vinyl/vinylidene-terminated polyolefin to modify an engineering thermoplastic to form the graph copolymer of any one of paragraphs 1-20.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A graft copolymer comprising polyolefin and engineering thermoplastic components, the graft copolymer having the structure:

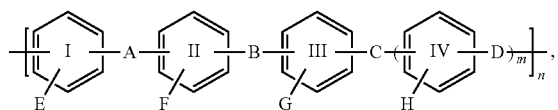

wherein each I, II, III, and IV are, independently, 1,2-phenyl, 1,3-phenyl or 1,4-phenyl, any of which may be substituted with one or more electron-donating substituents;

at least one of A, B, C, and D are, independently, an oxygen, nitrogen, sulfur, or phosphorous atom, or a moiety comprising oxygen, nitrogen, sulfur, phosphorous, or a combination thereof;

at least one of E, F, G, and H are one, two or three polyolefins bound to I, II, III, and IV, respectively, and having a weight average molecular weight of at least 300 g/mole; and m is an integer within the range from 1 to 10, and n is an integer within the range from 10 to 500.

2. The graft copolymer of claim 1, wherein the electron-donating substituents are selected from the group consisting of $C_1$ to $C_{10}$ alkyls, $C_1$ to $C_{10}$ alkoxys, $C_1$ to $C_{10}$ mercaptans, chlorine, bromine, iodine, hydroxyl, and combinations thereof.

3. The graft copolymer of claim 1, wherein the A, B, C, and D substituents are selected from the group consisting of $C_1$ to $C_{10}$ carboxy-containing moieties, $C_1$ to $C_{10}$ imido-containing moieties, $C_1$ to $C_{10}$ sulfido-containing moieties, sulfur, sulfide, carboxy, carboxylate, imido, nitrogen, and combinations thereof.

4. The graft copolymer of claim 1, wherein the A, B, C, and D substituents are selected from the group consisting of —$CH_2$—NH—CO—$(CH_2)_4$—$CH_2$—, —OCOO—, CO—, pyromellitic diimidos, —$SO_2$—, sulfur, oxygen, nitrogen, phosphorous, and combinations thereof.

5. The graft copolymer of claim 1, wherein the ratio of the polyolefin component to the engineering thermoplastic component in the graft copolymer is within a range of from 99:1 to 1:99.

6. The graft copolymer of claim 1, wherein the graft copolymer is the reaction product of an engineering thermoplastic having at least one phenylene in the polymer backbone, and a vinyl/vinylidene terminated polyolefin having a weight average molecular weight of at least 300 g/mole.

7. The graft copolymer of claim 6, wherein the vinyl/vinylidene terminated polyolefin is selected from polyethylenes, polypropylenes, ethylene-propylene copolymers, polyisobutylenes, polydienes, propylene-based elastomers, ethylene-based plastomers, and combinations thereof.

8. The graft copolymer of claim 6, wherein the vinyl/vinylidene terminated polyolefin has a weight average molecular weight (Mw) within a range from 300 g/mole to 300,000 g/mole.

9. The graft copolymer of claim 6, wherein the engineering thermoplastic has a weight average molecular weight (Mw) within a range from 5,000 g/mole to 80,000 g/mole.

10. The graft copolymer of claim 6, wherein the reaction is facilitated with a Friedel-Crafts type of catalyst at a temperature within the range from 80° C. to 200° C.

11. The graft copolymer of claim 1, wherein the Young's Modulus of the graft copolymer is at least 2 times or 3 times the value of the vinyl/vinylidene terminated polyolefin.

12. The graft copolymer of claim 1, wherein the Notched Izod Impact strength of the graft copolymer is at least 2 times the value for the engineering thermoplastic.

13. The graft copolymer of claim 6, wherein for the engineering thermoplastic, A, B, C, and D are oxygen, and I, II, III, and IV are 2,6-dimethyl-1,4-phenyl, and m is 1.

14. The graft copolymer of claim 1, having a branching index, $g_{vis \cdot avg}$, of less than 0.80.

15. The graft copolymer of claim 1, wherein the z-average molecular weight, $M_z$, is within a range from 50,000 g/mole to 600,000 g/mole.

16. The graft copolymer of claim 1, wherein the Young's Modulus is within a range of from 250 MPa to 320 MPa.

17. A composition comprising a blend of the graft copolymer of claim 1 and a second engineering thermoplastic.

18. The composition of claim 17, wherein the graft copolymer is present within a range of from 5 wt % to 40 wt % based on the weight of the combination of the graft copolymer and engineering thermoplastic.

19. The composition of claim 17, wherein the HDT of the composition is within a range of from 150° C. to 240° C.

20. The composition of claim 17, further comprising a second polyolefin.

21. A structural component comprising the graft copolymer of claim 1.

22. A graft copolymer comprising polyolefin and engineering thermoplastic components, wherein the engineering thermoplastic component is a polymer comprising heteroatoms or heteroatom containing moieties in its backbone and phenyl or substituted phenyl groups, the polyolefin component covalently bound to the engineering thermoplastic component.

23. The graft copolymer of claim 22, wherein the polyolefin component has a weight average molecular weight (Mw) within a range from 300 g/mole to 300,000 g/mole.

24. The graft copolymer of claim 22, wherein the ratio of the polyolefin component to the engineering thermoplastic component in the graft copolymer is within a range of from 90:10 to 10:90.

25. The graft copolymer of claim 22, wherein the graft copolymer has the structure:

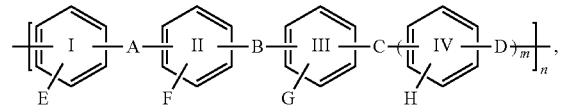

wherein each I, II, III, and IV are, independently, 1,2-phenyl, 1,3-phenyl or 1,4-phenyl, any of which may be substituted with one or more electron-donating substituents;

at least one of A, B, C, and D are, independently, an oxygen, nitrogen, sulfur, or phosphorous atom, or a moiety comprising oxygen, nitrogen, sulfur, phosphorous, or a combination thereof;

at least one of E, F, G, and H are one, two or three polyolefins bound to I, II, III, and IV, respectively, and having a weight average molecular weight of at least 300 g/mole; and m is an integer within the range from 1 to 10, and n is an integer within the range from 10 to 500.

* * * * *